(12) United States Patent
Hanano

(10) Patent No.: US 7,916,946 B2
(45) Date of Patent: Mar. 29, 2011

(54) IMAGE PROCESSING APPARATUS FOR IDENTIFYING AND CLASSIFYING AN OBJECT IN AN IMAGE, METHOD OF CONTROLLING SAME, AND COMPUTER-READABLE STORAGE MEDIUM STORING A COMPUTER PROGRAM FOR CONTROLLING SAME

(75) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 11/775,537

(22) Filed: Jul. 10, 2007

(65) Prior Publication Data
US 2008/0025606 A1 Jan. 31, 2008

(30) Foreign Application Priority Data

Jul. 26, 2006 (JP) .................................. 2006-203734
Jun. 15, 2007 (JP) .................................. 2007-159497

(51) Int. Cl.
*G06K 9/34* (2006.01)
*G06K 9/62* (2006.01)
*G06K 9/00* (2006.01)

(52) U.S. Cl. ........................................ 382/175; 382/224
(58) Field of Classification Search .................. 382/152, 382/173, 175, 181, 190, 224, 276, 277, 287, 382/306, 309; 358/501, 526, 528, 530; 345/145, 345/156, 333, 689; 707/200, 403, 453, 507, 707/508
See application file for complete search history.

(56) References Cited

U.S. PATENT DOCUMENTS

| 4,659,227 | A  | * | 4/1987  | Sato et al. ...................... 356/401 |
| 4,944,022 | A  | * | 7/1990  | Yasujima et al. .............. 382/155 |
| 5,241,609 | A  | * | 8/1993  | Hasebe et al. ................. 382/163 |
| 5,416,849 | A  | * | 5/1995  | Huang .......................... 382/173 |
| 5,689,582 | A  | * | 11/1997 | Murakami ..................... 382/176 |
| 5,793,903 | A  | * | 8/1998  | Lopresti et al. ................ 382/309 |
| 6,360,011 | B1 | * | 3/2002  | Katsumata et al. ............ 382/181 |
| 6,408,106 | B1 | * | 6/2002  | Tatsuta et al. ................. 382/287 |
| 6,567,546 | B1 | * | 5/2003  | Eguchi et al. ................. 382/181 |
| 7,283,685 | B2 | * | 10/2007 | Chien et al. ................... 382/287 |
| 2008/0025606 | A1 | * | 1/2008 | Hanano ......................... 382/175 |
| 2008/0247635 | A1 | * | 10/2008 | Davis et al. ................... 382/152 |

FOREIGN PATENT DOCUMENTS

| JP | 05-054120    | 3/1993 |
| JP | 11-175705    | 7/1999 |
| JP | 2000-165651  | 6/2000 |
| JP | 2003-046731  | 2/2003 |

* cited by examiner

*Primary Examiner* — Amir Alavi
(74) *Attorney, Agent, or Firm* — Cowan, Liebowitz & Latman, P.C.

(57) ABSTRACT

Disclosed is an image processing apparatus in which a marked image is extracted more accurately and classification based upon the type of mark is made possible. The apparatus includes an extraction unit adapted to extract information representing a region position of an object and information representing a region position of a mark as an object list and mark list, respectively, from the document image that has been scanned by a scanning unit; and a search unit adapted to search for information representing the region position of a mark in the mark list for which the distance is the shortest with respect to information representing a region position of each object in the object list.

10 Claims, 26 Drawing Sheets

USUAL CROPPING FRAME

CROPPING FRAME INCLUDES MARK

CROPPING FRAME DOES NOT INCLUDE MARK

MARK RECOGNIZED AS SEPARATE
CROPPING FRAME

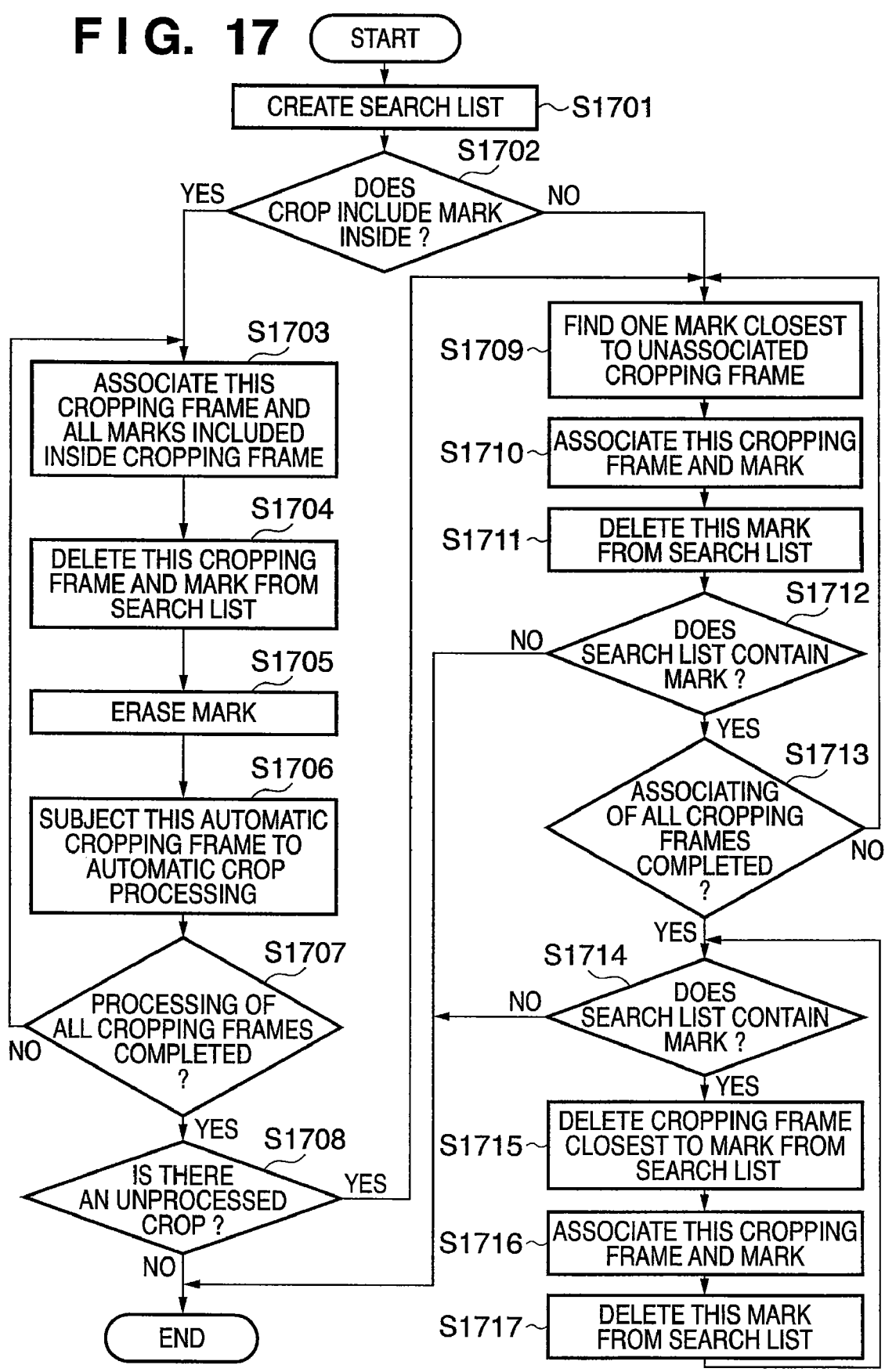

F I G. 19
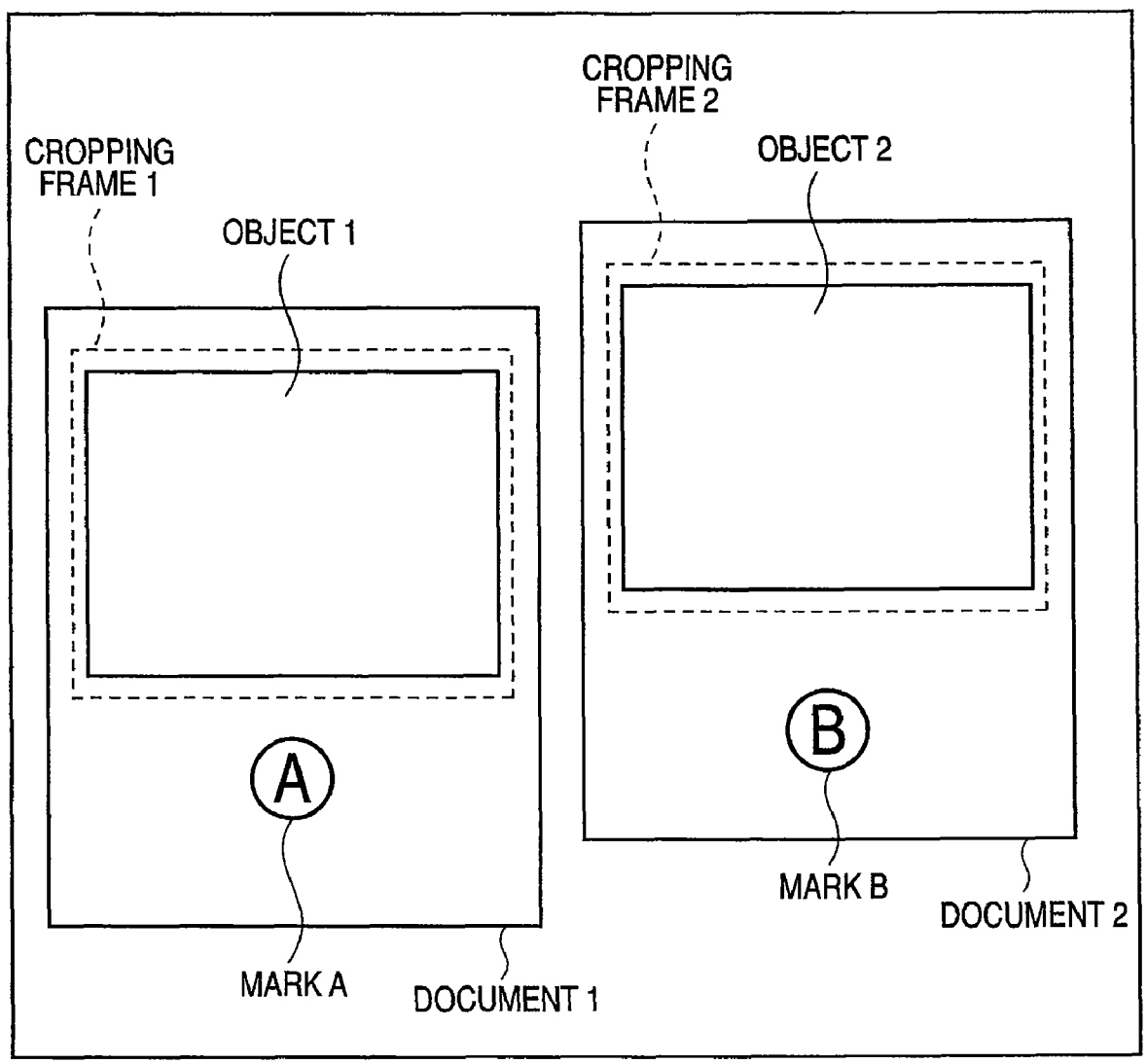

F I G. 20

| DETECTED CROPPING FRAME | POSITION OF CROPPING FRAME |
|---|---|
| 1 | (X1, Y1) |
| 2 | (X2, Y2) |
| 3 | (X3, Y3) |

F I G. 21

| MARK | NUMBER OF MARKS | CLASSIFICATION | MARK POSITION |
|---|---|---|---|
| A | 1 | C:¥Photo1 | (X5, Y5) |
| B | 1 | C:¥Photo2 | (X10, Y10) |
| C | 2 | C:¥Photo3 | (X15, Y15) |
| | | C:¥Photo3 | (X30, Y25) |

IMAGE PROCESSING APPARATUS FOR IDENTIFYING AND CLASSIFYING AN OBJECT IN AN IMAGE, METHOD OF CONTROLLING SAME, AND COMPUTER-READABLE STORAGE MEDIUM STORING A COMPUTER PROGRAM FOR CONTROLLING SAME

BACKGROUND OF THE INVENTION

1. Field of the Invention

The present invention relates to an image processing technique for extracting an image to which a mark has been added and classifying the image based upon the type of mark.

2. Description of the Related Art

There are occasions where one desires to use an image reader such as a scanner to read and store, as digital data, film exposed by an instant camera or a paper medium such as a photograph having a margin. In particular, there is also strong demand for a system in which a plurality of photographs are placed on the document glass of a scanner, the photographs are read at one time, the read images are cropped and each of the cropped images is classified and stored.

In order to satisfy these demands, the specification of Japanese Patent Application Laid-Open No. 2000-165651 (Document 1) discloses a technique in which an image region desired to be cropped (referred to as a "crop region") on a paper medium is enclosed by a line using a pen or the like and information on the paper medium is identified based upon the color or shape of the line or a symbol in the vicinity of the line. By associating the result of identification and previously registered classification information, a cropped image is stored in a specified folder.

Although Document 1 performs identification by enclosing a crop region on a paper medium by a line using a pen or the like, there is also a technique for identifying a document region automatically. For example, the specification of Japanese Patent Application Laid-Open No. 2003-046731 (Document 2) discloses a technique for automatically detecting the positions and sizes of a plurality of documents that a user has placed on a document glass, and enabling the cropping of each document.

However, in a case where an image region on a paper medium is cropped and classified, as described in Document 1, it is required that all image regions be enclosed by lines using a pen or the like. In other words, the user is forced to perform a complicated operation as preliminary processing for cropping images. Furthermore, since a cropped image is a region enclosed by a line using a pen or the like, it is difficult for the image region itself to be identified accurately.

Further, in a case where the margin of a document having a margin is marked and read using the technique of automatically identifying document regions described in Document 2, there are instances where the mark is detected erroneously as one document region, as illustrated in FIG. 4D, depending upon the position and size of the mark. Further, there are instances where a cropping frame having a size larger than that of the document region is detected as a cropping frame that contains the mark, as illustrated in FIG. 9B. Furthermore, in a case where the document region and the mark are spaced away from each other, as illustrated in FIG. 9C, the cropping frame and the mark cannot be associated with each other correctly even if the cropping frame has been detected correctly.

SUMMARY OF THE INVENTION

Accordingly, the present invention has been devised in view of the foregoing problems and its object is to provide a technique whereby an image to which mark has been added is extracted more accurately and classification based upon the type of mark is made possible.

According to one aspect of the present invention, an image processing apparatus for identifying an object in a document image, which has been scanned by a scanning unit, as well as a mark that has been added to the document, and storing image data of the object in a storage unit upon classifying the image data in accordance with the mark identified, the apparatus comprising: an extraction unit adapted to extract information representing a region position of the object and information representing a region position of the mark as an object list and mark list, respectively, from the document image that has been scanned by the scanning unit; and a search unit adapted to search for information representing the region position of a mark in the mark list for which the distance is the shortest with respect to information representing a region position of each object in the object list.

According to another aspect of the present invention, a method of controlling an image processing apparatus for identifying an object in a document image, which has been scanned by a scanning unit, as well as a mark that has been added to the document, and storing image data of the object in a storage unit upon classifying the image data in accordance with the mark identified, the method comprising: an extraction step of extracting information representing a region position of the object and information representing a region position of the mark as an object list and mark list, respectively, from the document image that has been scanned by the scanning unit; and a search step of searching for information representing the region position of a mark in the mark list for which the distance is the shortest with respect to information representing a region position of each object in the object list.

According to still another aspect of the present invention, a program for controlling an image processing apparatus for identifying an object in a document image, which has been scanned by a scanning unit, as well as a mark that has been added to the document, and storing image data of the object in a storage unit upon classifying the image data in accordance with the mark identified, the program comprising: program code for executing an extraction step of extracting information representing a region position of the object and information representing a region position of the mark as an object list and mark list, respectively, from the document image that has been scanned by the scanning unit; and program code for executing a search step of searching for information representing the region position of a mark in the mark list for which the distance is the shortest with respect to information representing a region position of each object in the object list.

In accordance with the present invention, there can be provided a technique whereby a marked image is extracted more accurately and classification based upon the type of mark is made possible.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a flowchart representing an operation for associating cropping frames and marks in a second modification;

FIG. 19 is a diagram illustrating an example of a case where cropping frames and marks are appropriately associated with respective ones of two documents;

FIG. 20 is a diagram illustrating an object list; and

FIG. 21 is a diagram illustrating a mark list.

DESCRIPTION OF THE EMBODIMENTS

Preferred embodiments of the present invention will now be described in detail with reference to the drawings. It should be noted that the constituents described in this embodiment are exemplary and that the scope of the present invention is not limited solely to these constituents.

First Embodiment

A system (referred to as an "image scanning system" below) comprising a scanner and a computer will be described below as a first embodiment of an image reading apparatus according to the present invention.

System Configuration

Figure 1:
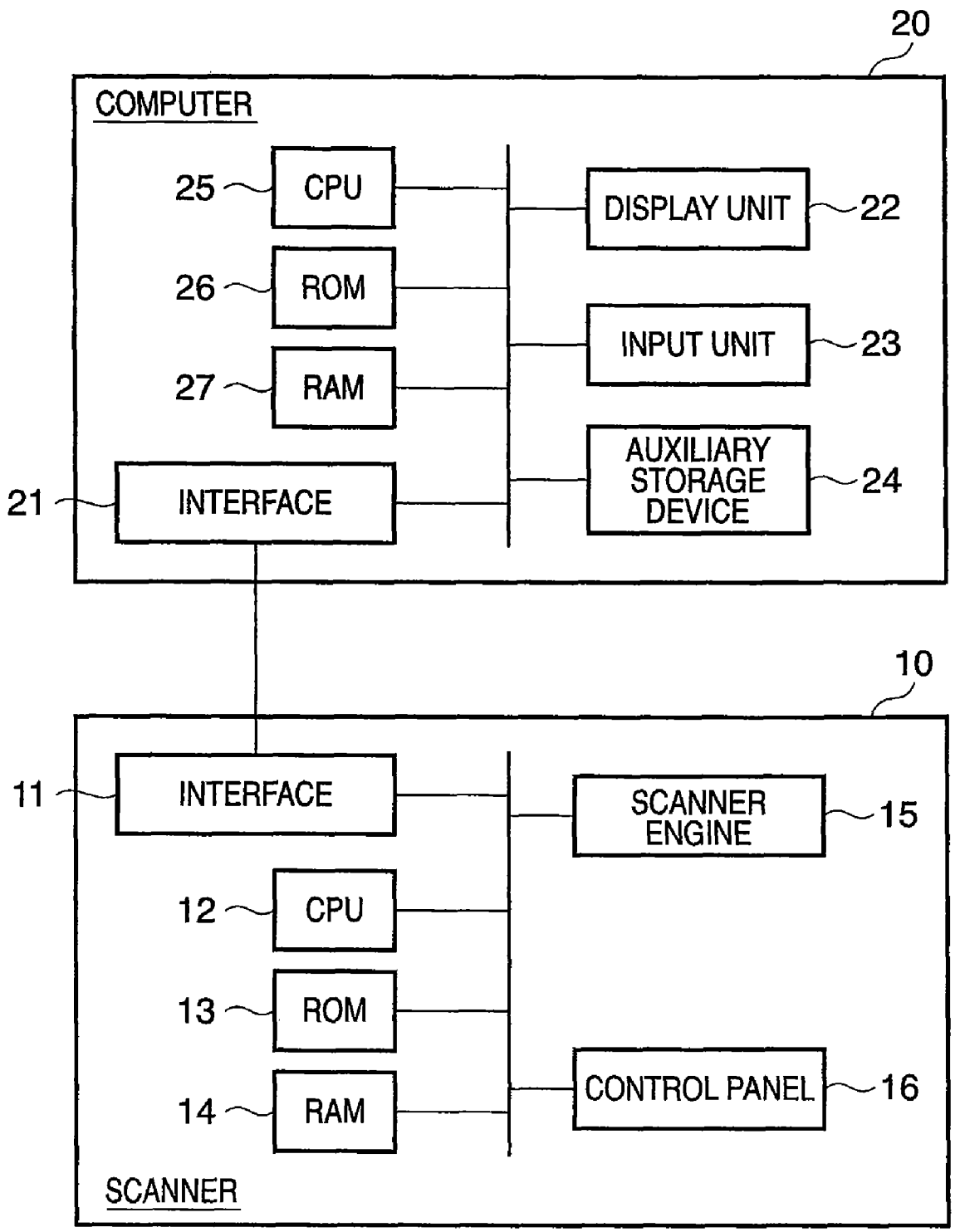
FIG. 1 is a hardware block diagram illustrating an image scanning system according to a first embodiment of the present invention.

FIG. 1 is a hardware block diagram illustrating an image scanning system according to a first embodiment of the present invention.

As illustrated in FIG. 1, this image scanning system includes a computer 20 for implementing various processing based upon an application, image scanning processing using a scanner driver, and image processing; and a scanner 10 connected to the computer 20 by wire or wirelessly.

The scanner 10 reads a document and generates image data based upon control from the computer 20 and transmits the image data to the computer 20. The computer 20 functions as a host apparatus that transmits various control commands capable of being interpreted by the scanner 10 and receives image data from the scanner 10.

The computer 20 has a CPU 25 for executing various programs. The computer 20 further includes a ROM 26 in which various data and various programs for controlling the computer 20 have been stored beforehand in a non-volatile manner, and a RAM 27 for storing data and programs temporarily. The computer 20 further includes an interface 21 for sending and receiving data to and from peripherals such as the connected scanner 10. Also connected to the computer 20 are a display unit 22 such as a color display, an input unit 23 such as a keyboard and pointing device, and an internal or externally mounted auxiliary storage device 24.

The scanner 10 is a CCD-type color image scanner, by way of example. The CCD color image scanner optically reads a document, which has been placed on a document glass, by causing the document to be scanned by a CCD line sensor (not shown), and converts the document to image data. The scanner 10 has an interface 11 for sending and receiving data to and from the host apparatus, such as the computer 20. The scanner 10 further includes a CPU 12 for executing various programs; a ROM 13 in which various data and various programs for controlling the scanner 10 have been stored beforehand in a non-volatile manner; and a RAM 14 for storing various data such as read image data temporarily. The scanner 20 further includes a scanner engine 15 for controlling a document scanning unit on which a CCD image sensor is mounted, and a control panel 16. The control panel 16 has a display for displaying scanner status and menus, etc., and an input unit for accepting operations performed by the user.

Figure 2:
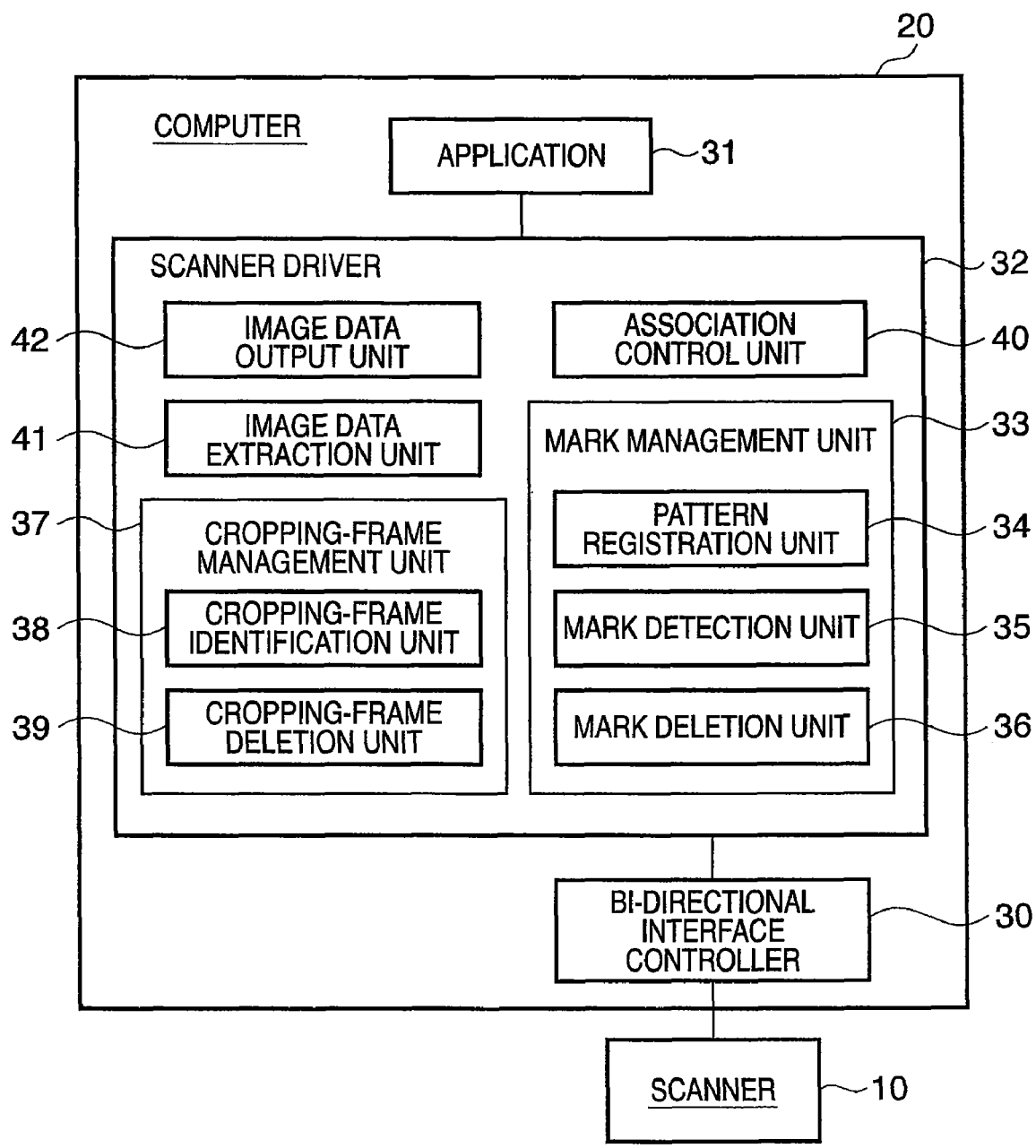
FIG. 2 is a functional block diagram of a computer.

FIG. 2 is a functional block diagram of the computer 20.

As illustrated in FIG. 2, the functions possessed by the computer 20 are classified according to functions implemented by an application 31 and a scanner driver 32 executed by the CPU 25. The application 31 acquires image data from a data source compliant with the TWAIN standard, by way of example. The application 31 applies various processing to the image data and then renders the image data on the display unit 22 or stores it in the auxiliary storage device 24 as a file. The scanner driver 32 transmits a control command for controlling the scanner 10 or receives image data via a bi-directional interface controller 30 as a data source compliant with the TWAIN standard.

The scanner driver 32 includes a mark management unit 33; a cropping-frame management unit 37 for managing a cropping frame; an association control unit 40 for controlling the association between marks and cropping frames, described later; an image data extraction unit 41; and an image data output unit 42.

The mark management unit 33 includes a pattern registration unit 34, a mark detection unit 35 and a mark deletion unit 36. The pattern registration unit 34 is a functional unit that reads a mark from a document placed on the document glass and registers the mark beforehand as a pattern. The mark detection unit 35 analyzes image data over the entirety surface of the document glass, performs pattern matching against patterns registered in advance, acquires the number of marks that match, classification information about the marks and mark position information, and manages these items as a mark list illustrated in FIG. 21. The mark deletion unit 36 is a functional unit which, on the basis of the mark position information obtained by the mark detection unit 35, executes image processing such as for making a conversion to white-color or background-color data, thereby erasing a mark image while leaving the information in the mark list as is.

Figure 9A:
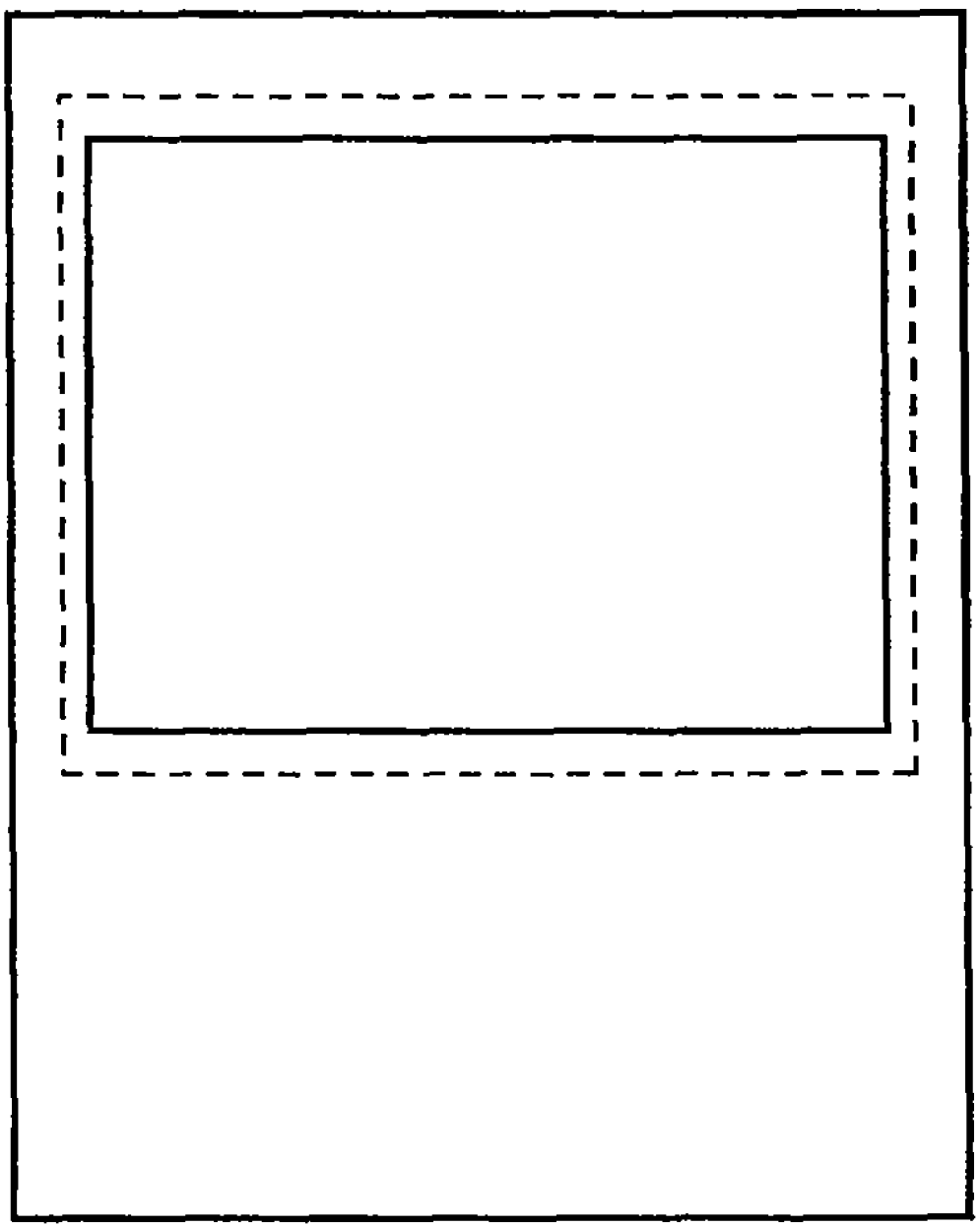
FIGS. 9A to 9D are diagrams exemplifying patterns that are the result of executing multiple-crop processing.

The cropping-frame management unit 37 comprises a cropping-frame identification unit 38 and a cropping-frame deletion unit 39. The cropping-frame identification unit 38 converts image data indicative of the entire surface of the document glass to a monochrome binary image. The cropping-frame identification unit 38 further performs automatic identification of document regions utilizing a density difference between a document cover (white) and each document region, by way of example. The result of recognition is displayed in a preview area 330 in a main dialog box 300 of the scanner driver 32 illustrated in FIG. 3, described later. More specifically, as illustrated in FIG. 9A, the cropping-frame identification unit 38 renders the cropping frame, which encloses the object within a document region, using lines such as dotted lines or dashed lines that can be identified by the user. The cropping-frame identification unit 38 acquires the number of cropping frames and position information as detection information in which the cropping frames have been detected, and manages these items as an object list illustrated in FIG. 20. The cropping-frame deletion unit 39 erases cropping frames rendered by the cropping-frame identification unit 38.

Basic Operation of System

Figure 3:
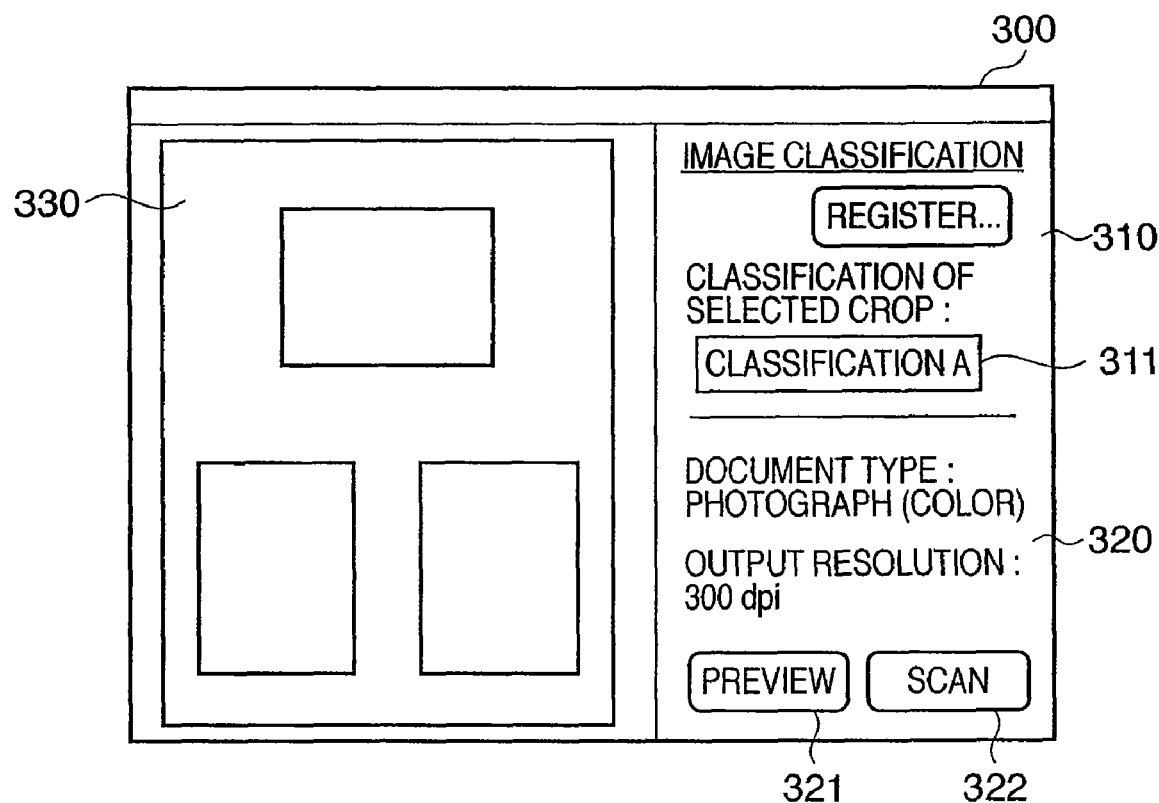
FIG. 3 is a diagram illustrating a main dialog box displayed when an image is read.

FIG. 3 is a diagram illustrating a main dialog box displayed on the display unit 22 when an image is read.

The main dialog box 300 is a screen that accepts various settings and operation commands from the user. The screen of the main dialog box 300 is displayed on the display unit 22 in response to the scanner driver 32 being started up and executed by the CPU 25. A "PREVIEW" button 321 in the main dialog box 300 is a button clicked in order to scan the entire surface of the document glass of the scanner at a low resolution and display the scanning result in the preview area 330. By using a pointing device or the like, the user specifies a document image displayed in the preview area 330 and then clicks a "SCAN" button 322 to perform scanning (main scanning) for storing the image. A "REGISTER" button in the main dialog box 300 is a button clicked to display a pattern-registration dialog box for reading a mark from a document placed on the document glass and registering a pattern, described later.

Figure 5:
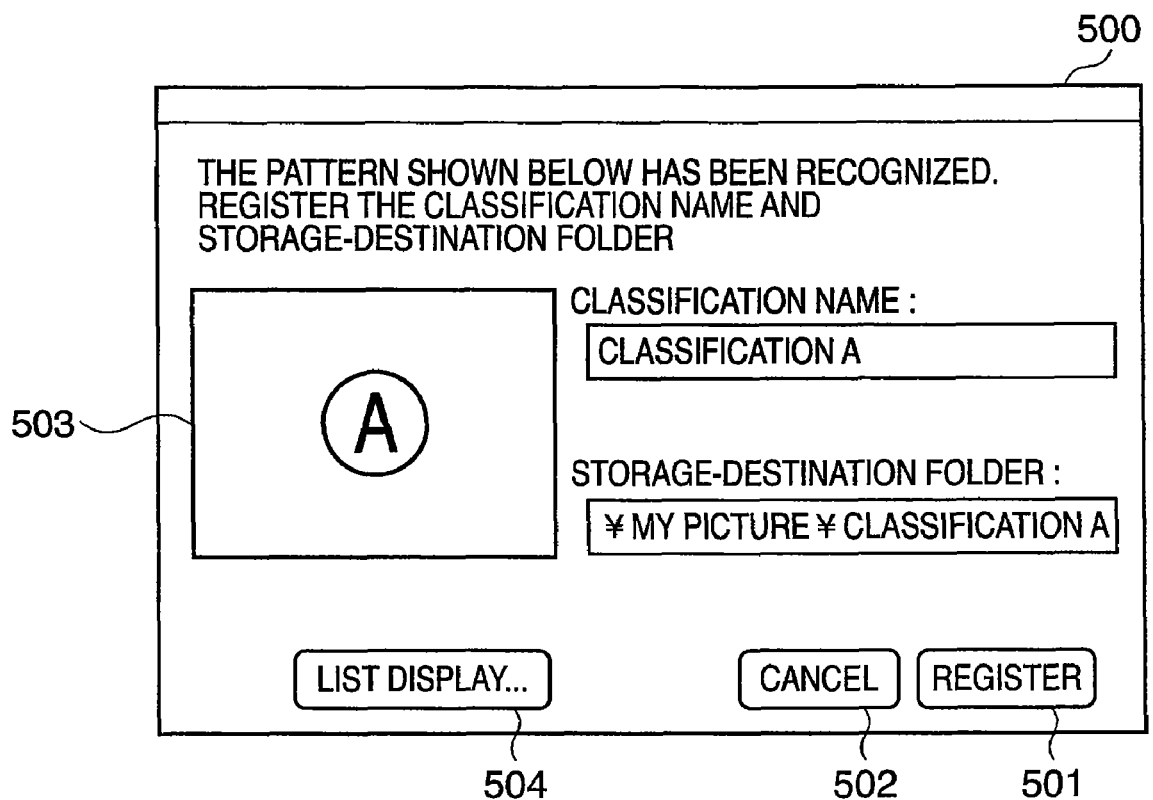
FIG. 5 is a diagram illustrating a dialog box for pattern registration.

FIG. 5 is a diagram illustrating the pattern-registration dialog box.

The user specifies a classification name and save-destination folder for storage of every mark pattern and registers these by a "REGISTER" button 501. If the user clicks a "LIST DISPLAY" button 504, the patterns of marks previously registered are displayed in the form of a list. Further, it may be so arranged that a classification name and set content of a save-destination folder can be edited with respect to a pattern that has already been registered.

Figure 4:
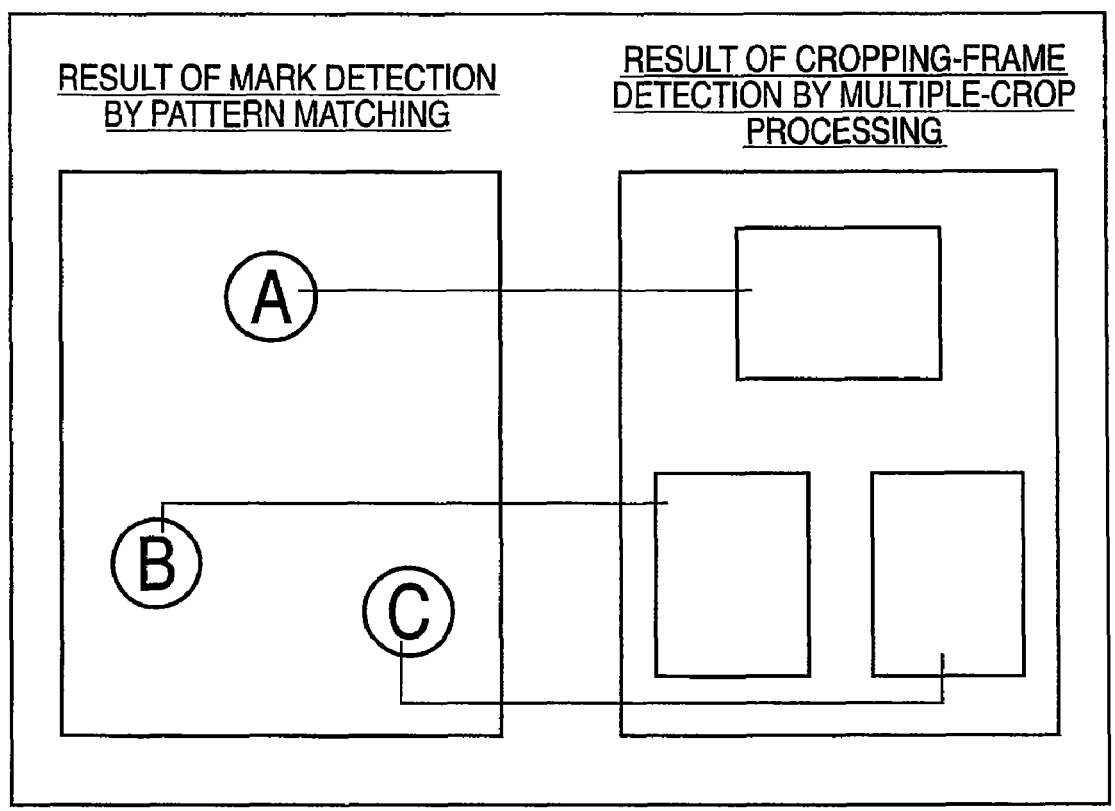
FIG. 4 is a conceptual view of association between marks and cropping frames retrieved at the time of prescanning.

FIG. 4 is a conceptual view of association between marks and cropping frames retrieved at the time of prescanning.

This processing is executed in response to execution of the scanner driver 32 by the CPU 25. The association control unit 40 is for associating cropping frames identified by the cropping-frame identification unit 38 and marks detected by the mark detection unit 35.

The image data extraction unit 41 extracts, as image data, the images within cropping frames identified by the cropping-frame identification unit 38 from image data on the entire surface of the document glass. The image data output unit 42 transfers the image data, which has been extracted by the image data extraction unit 41, to an application via a TWAIN data source manager, by way of example. It should be noted that it is required that the image data possess previously registered classification information and save-destination folder information. For example, the scanner driver 32 sets a vendor-specific extension parameter as custom capability definable by TWAIN, whereby the application 31 is capable of performing storage based upon this set content.

Figure 6:
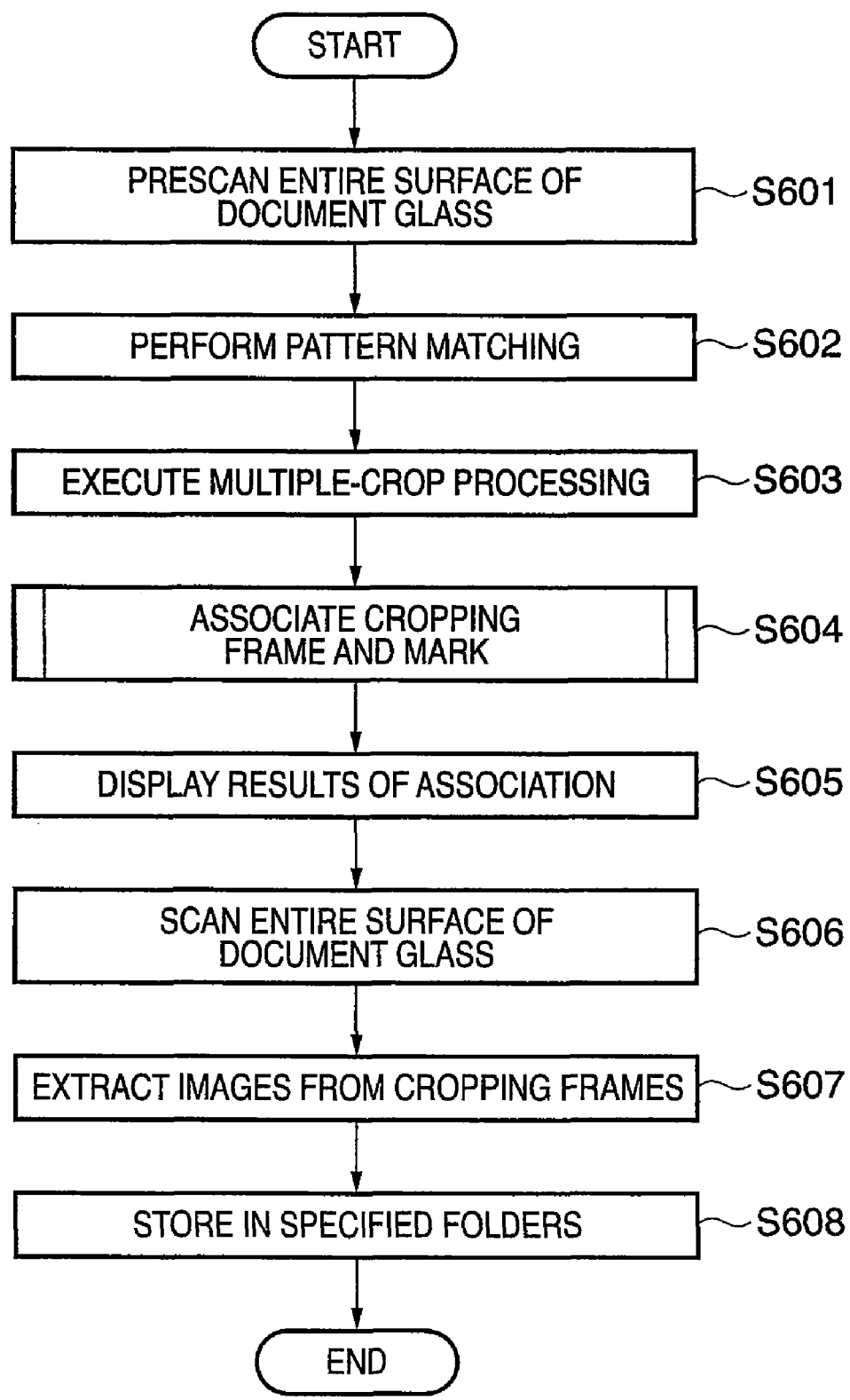
FIG. 6 is an overall operation flowchart up to the reading and storing of a document placed on a document glass.

FIG. 6 is an overall operation flowchart of processing up to the reading and storing of a document placed on a document glass. It should be noted that it is assumed that the above-mentioned mark pattern registration has already been completed. Furthermore, each step described below is implemented in response to execution of the scanner driver 32 by the CPU 25.

At step S601, the CPU 25 accepts the clicking of "PREVIEW" in the main dialog box 300 of scanner driver 32 shown in FIG. 3. Prescanning of the entire surface of the document glass is executed using the clicking of "PREVIEW" as a trigger. Prescanning is a confirmation operation for allowing the user to identify at which positions on the document glass documents have been placed.

At step S602, detection of marks that have been added to documents is performed by pattern matching based upon the images obtained by prescanning of the overall surface of the document glass, and the mark list is created. It is assumed that types of marks, number of marks, classification information and position information of each mark are included as the information in the mark list.

At step S603, object regions within documents are detected as cropping frames by the cropping-frame identification unit 38 (this detection is referred to as "multiple-crop processing" below), and the object list is created. It is assumed that the information in the object list includes the number of cropping frames and positions of these cropping frames.

The association control unit 40 associates each of the detected cropping frames with each of the marks at step S604. The details of the associating procedure will be described later.

The results of the associating processing are displayed in the dialog box of FIG. 3 by the association control unit 40 at step S605. For example, if a certain document is focused on by operating a mouse, classification name information is displayed in a "CLASSIFICATION OF SELECTED BLOCK" field of an image classification area, as illustrated in FIG. 3. In FIG. 3, the diagram focused on and selected by the mouse cursor is indicated by hatching. Alternatively, a display of simple explanatory text may be presented for all of the documents in the preview area. The user can readily identify the documents regardless of which method is used.

If it has been determined based upon the result displayed at step S605 that there is no problem in the associating operation, then scanning (main scanning) is performed at step S606 in accordance with the types of documents and settings such as scanning resolution. This determination is implemented in response to clicking of the "SCAN" button by the user, by way of example. If a problem arises in the associating operation, the correct association is set in the dialog box.

At step S607, the image data extraction unit 41 reads the images on the document glass and extracts the image data of the objects within the cropping frames.

At step S608, the image data output unit 42 transfers the image data of the objects to the application together with information of the storage-destination folders that have been associated with the type-name information by the association information. This makes it possible for the application to store files in specified folders.

Figure 7:
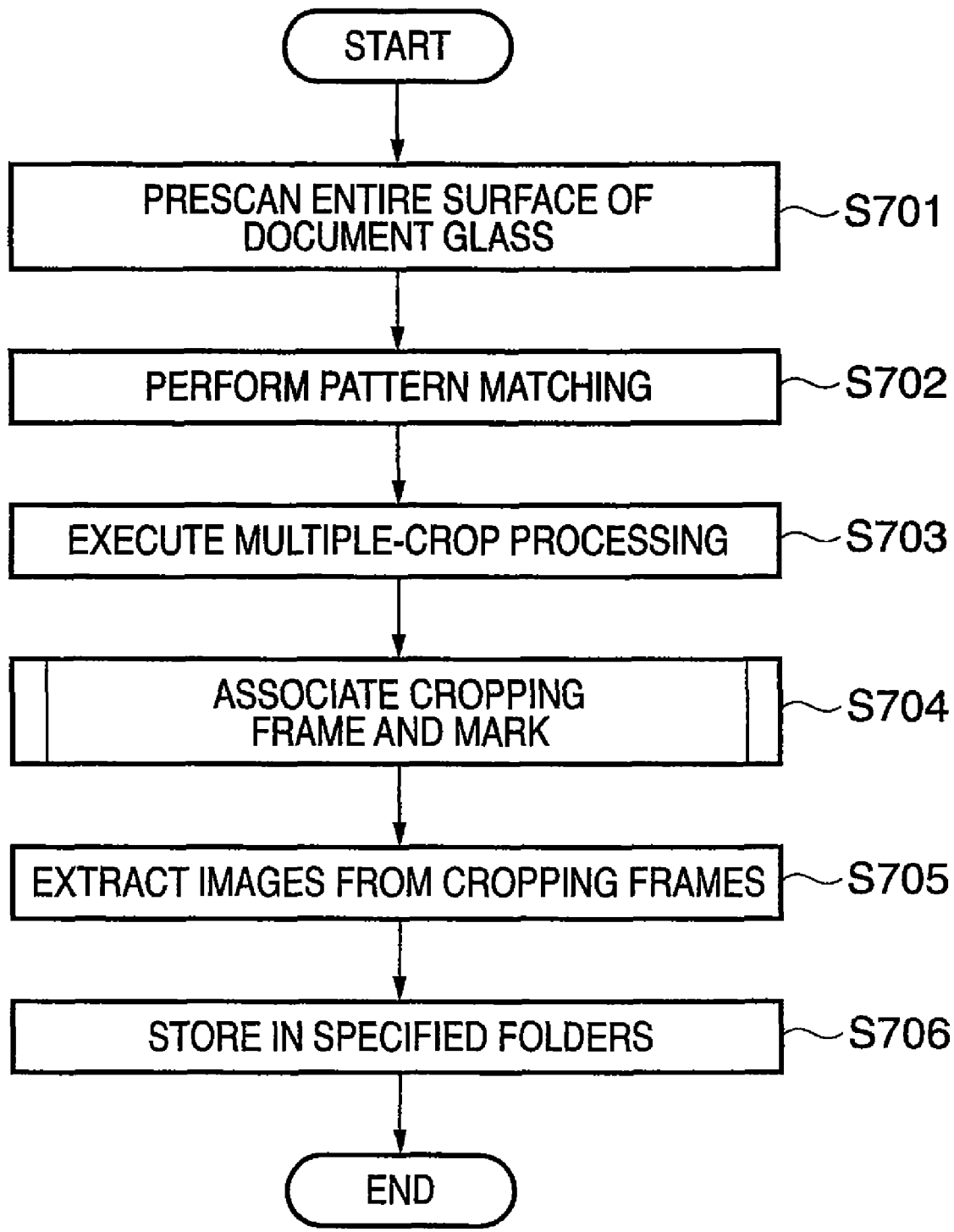
FIG. 7 is an overall operation flowchart in a case where preview is not performed.

FIG. 7 is an overall operation flowchart in a case where preview is not performed.

The flow of operation shown in FIG. 6 is an example in which the results of classification are confirmed in advance by preview. As illustrated in FIG. 7, however, first the "SCAN" button is clicked to start the scanning operation without previewing. If this flow of operation is adopted, storage of files in folders can be made possible merely by a single-click mouse operation.

Scanning of Marked Images

FIGS. 9A to 9D are diagrams exemplifying patterns that are the result of executing multiple-crop processing. FIG. 9A illustrates an example of results of detection of a cropping frame in a case where an image not having a mark has been scanned.

Figure 9B:
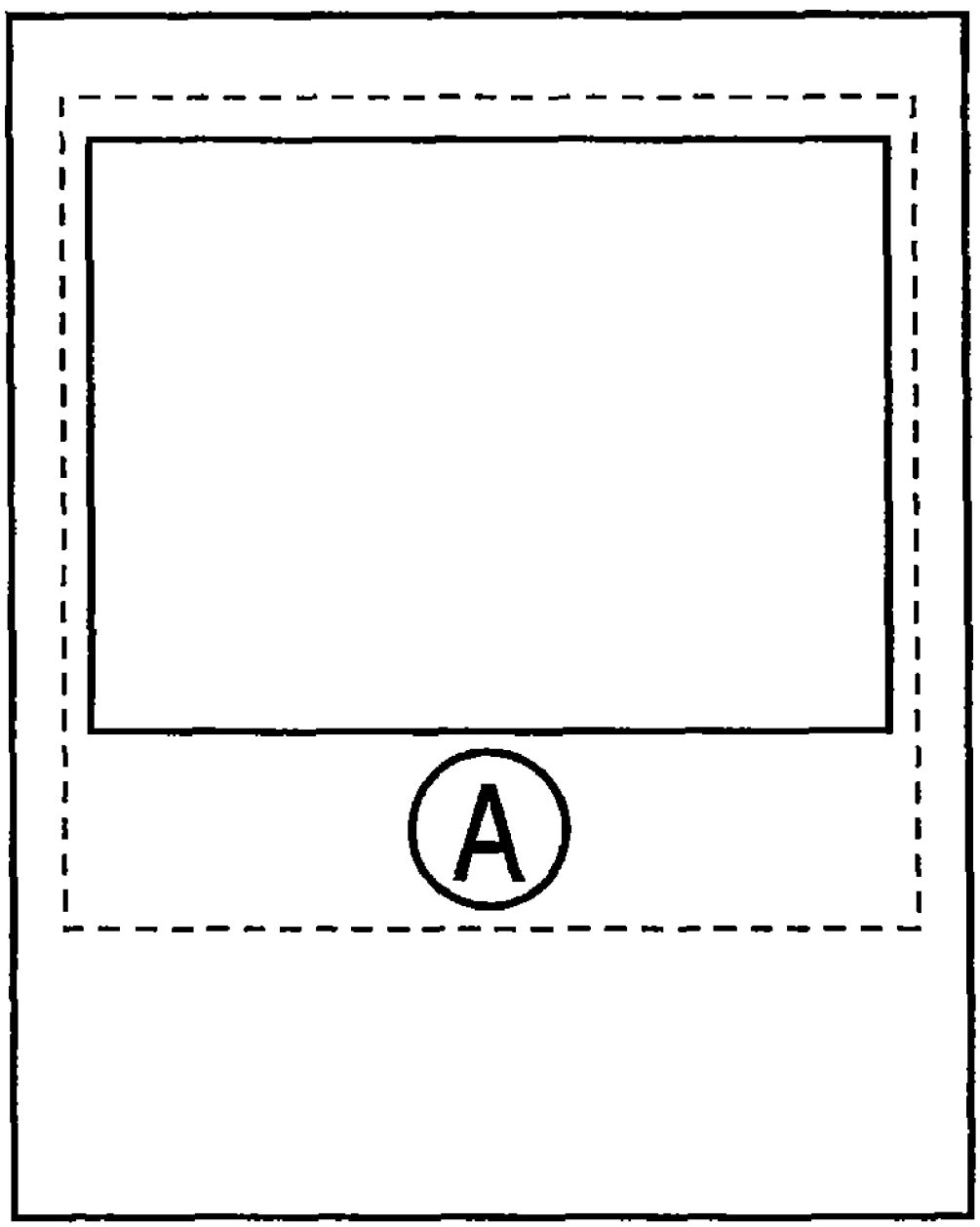
Figure 9C:
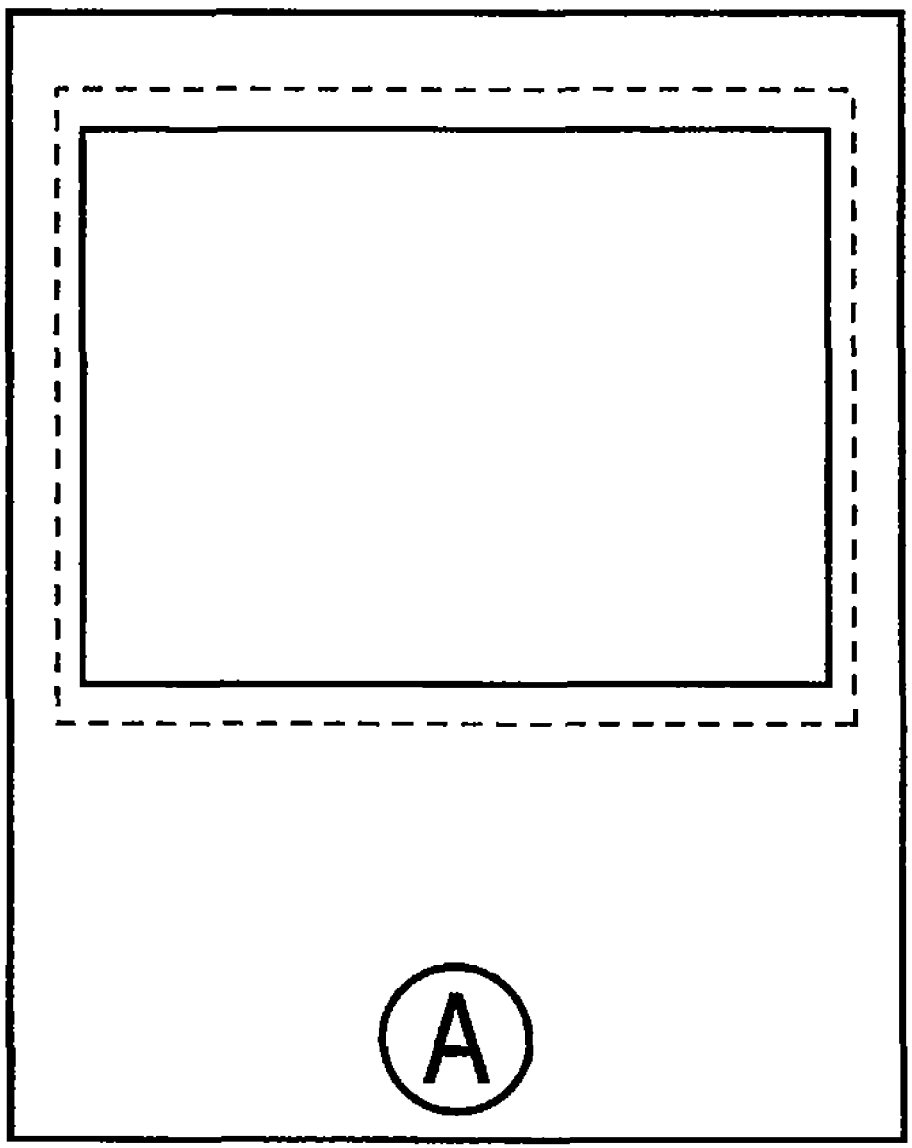
Figure 9D:
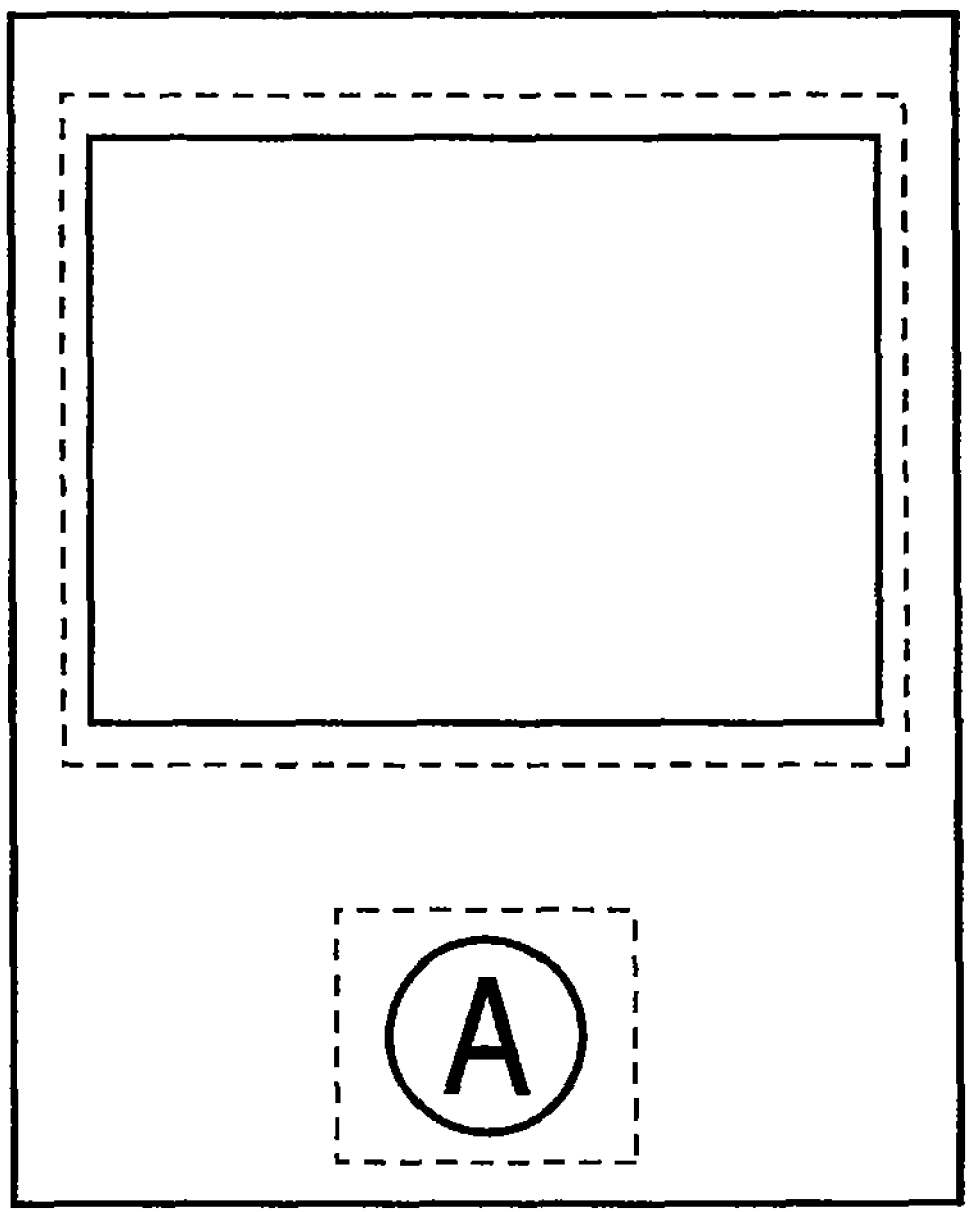

FIGS. 9B to 9D illustrate examples of results of detection of cropping frames in cases where image having marks have been scanned. More specifically, if a mark has been added on, the cropping frame is not always set correctly only in the image portion, as illustrated in FIG. 9C. That is, in multiple-crop processing, what is determined is solely whether or not there is an image on a document. If a mark has been added to a document, therefore, the three cropping frames set forth below may be detected depending upon the positions and sizes of the marks. Specifically, there are cases where a mark is recognized erroneously as part of the image (FIG. 9B) and where the mark itself is recognized erroneously as one image (FIG. 9D). In other words, the following three results can exist as cropping frames:

a cropping frame includes an image and a mark: FIG. 9B;
a cropping frame includes an image only: FIG. 9C; and
a cropping frame includes a mark only: FIG. 9D.

Figure 8A:
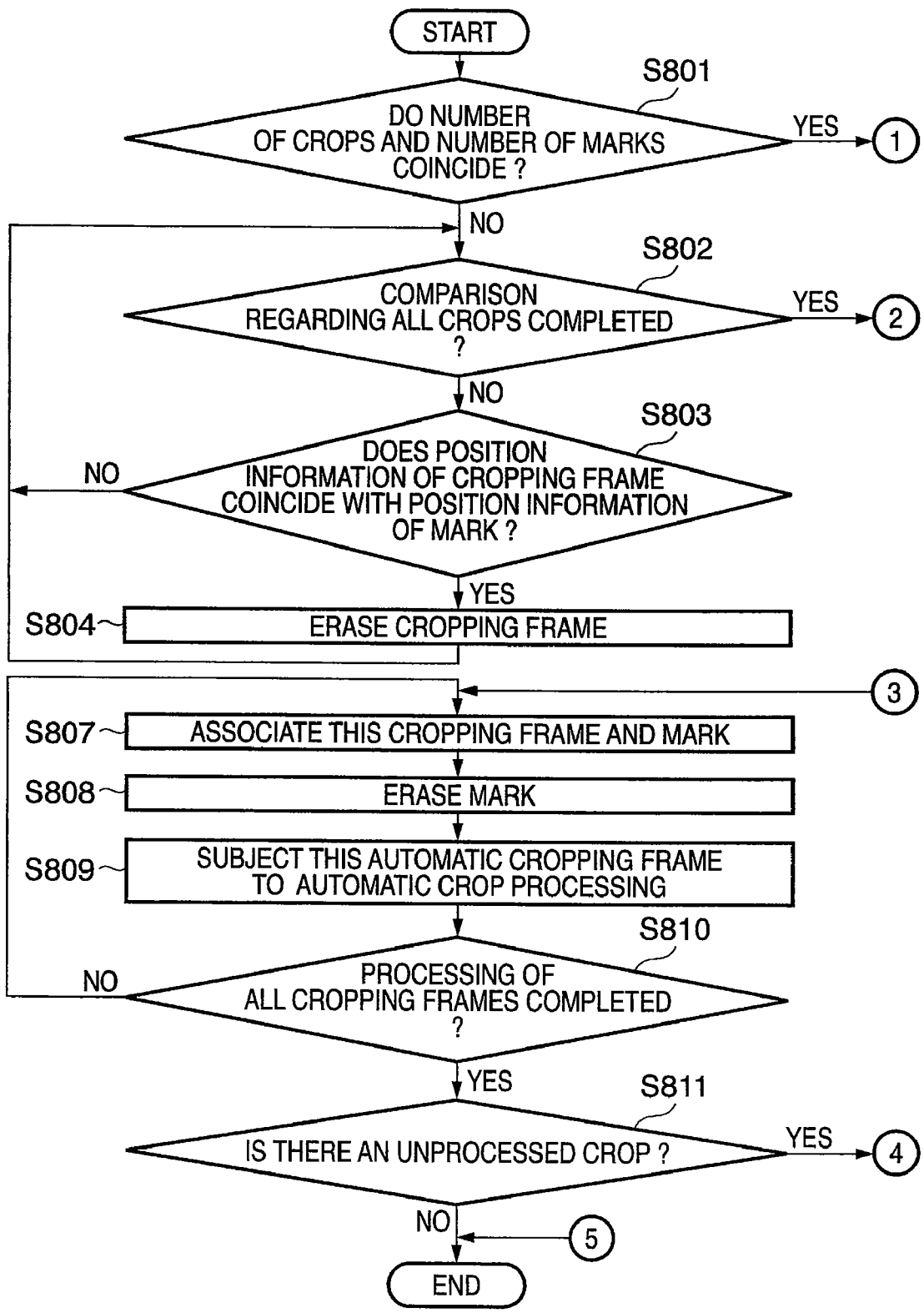
FIG. 8 is a flowchart representing an operation for associating cropping frames and marks.
Figure 8B:
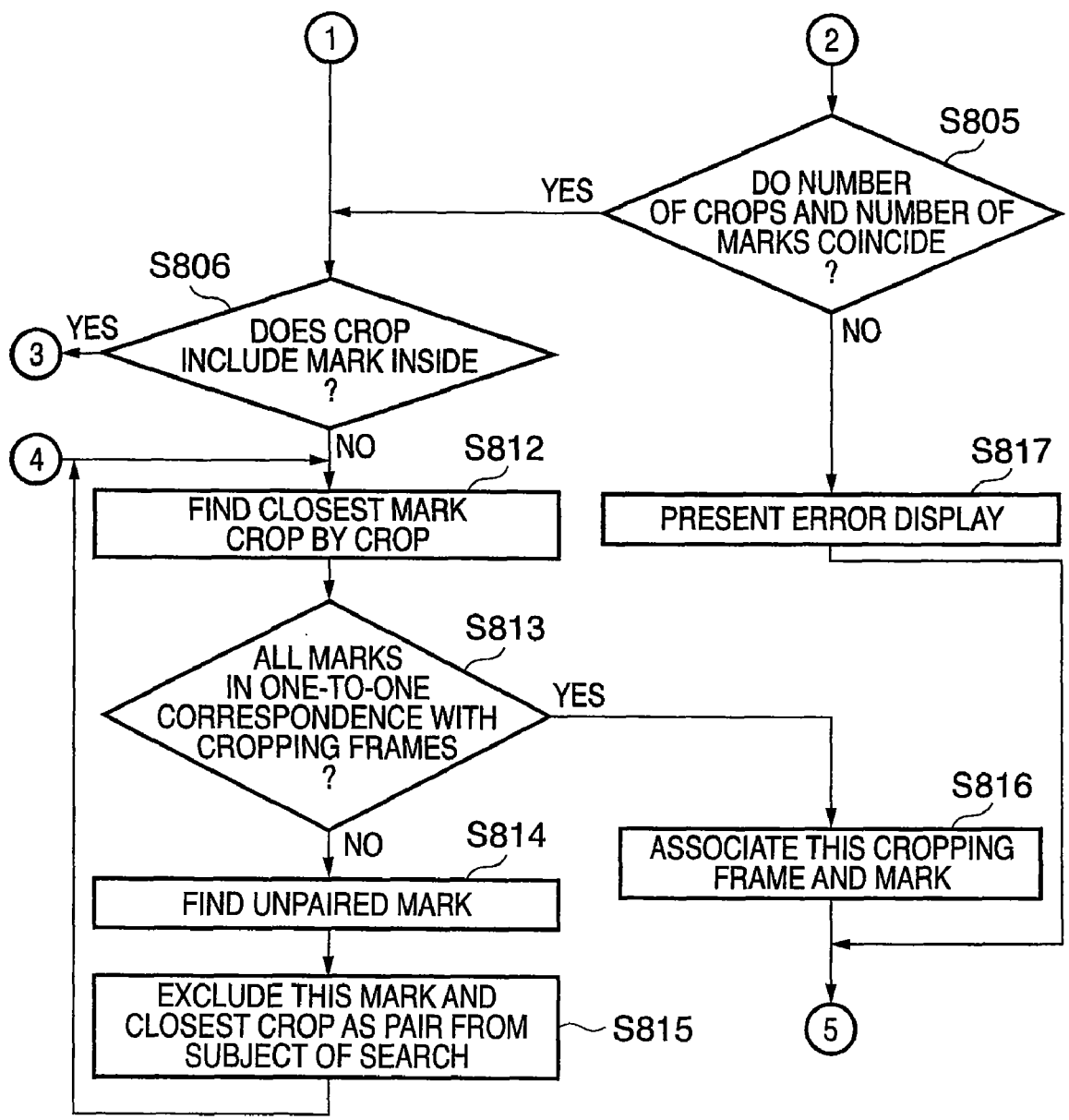

Here a technique for scanning an image having a mark will be described in detail. More specifically, a method of more accurately associating marks detected by pattern matching and cropping frames identified by multiple-crop processing in the case of documents in which one mark has always been added to the margins of all documents will be described. FIG. 8 is a flowchart representing an operation for associating cropping frames and marks by the association control unit 40. This processing corresponds to step S604 in FIG. 6 and assumes that the step of mark detection (S602) and the step of cropping-frame detection (S603) have already been completed. It should be noted that the steps set forth below are implemented by having the CPU 25 execute the scanner driver 32.

The number of detected crops and the number of marks are compared at step S801 based upon the object list and mark list. If the number of crops and the number of marks differ, i.e., if the number of marks is larger or smaller than the number of crops, control proceeds to step S802. If the numbers of marks and crops coincide, control proceeds to step S806.

It is determined at step S802 whether the processing of the succeeding step S803 has been completed with regard to all cropping frames. Control proceeds to step S805 if this processing has been completed and to step S803 if it has not.

With regard to the position information of a certain cropping frame, it is determined at step S803 whether a mark whose position information coincides with this information exists. In other words, it is determined whether a mark has been recognized erroneously as an image, as shown in FIG. 9D. If these items of position information coincide, then control proceeds to step S804; otherwise, control returns to step S802.

This cropping frame is erased at step S804. That is, the cropping frame that has been set with respect to the mark is erased.

The processing of steps S802 to S804 is confirmed with regard to all cropping frames. The results of the detection of cropping frames are the two results illustrated in FIGS. 9B and 9C.

The number of crops and the number of marks are compared at step S805. If the two coincide, control proceeds to step S806; otherwise, control proceeds to step S817.

It is determined at step S806 whether a certain cropping frame includes the position of a mark inside. If it is determined that a mark is contained within the cropping frame, control proceeds to step S807; otherwise, control proceeds to step S812.

This cropping frame and the mark are associated at step S807.

The mark associated at step S807 is erased at step S808. (Even if a mark is erased, the information that is the result of mark detection by the mark detection unit 35 is retained as is.) In other words, under the present circumstances, the cropping frame has been set as illustrated in FIG. 9B. Therefore the cropping frame is erased temporarily upon deleting the mark, and image recognition is performed again.

Crop processing (automatic crop processing) is executed at step S809 taking the region of the cropping frame erased at step S808 as the object. By executing this processing, the cropping frame can be set accurately with respect to the image region, as illustrated in FIG. 9C.

The processing of the foregoing steps S807 to S809 is confirmed with regard to all the cropping frames at step S810. If the processing has been completed with regard to all of the cropping frames, control proceeds to step S811; otherwise, control returns to step S807 and another cropping frame undergoes confirmation.

It is determined at step S811 whether an unprocessed cropping frame exists. In other words, it is determined whether a crop for which a mark is not included in the cropping frame shown in FIG. 9C exists. If it is determined that an unprocessed cropping frame does not exist, this means that mark associating processing has been completed for all crops. Hence, the flow of processing is exited. If it is determined that an unprocessed cropping frame exists, then control proceeds to step S812.

The mark closest to each cropping frame is searched and retrieved from the mark list and association is performed with regard to all cropping frames at step S812.

Figure 10:
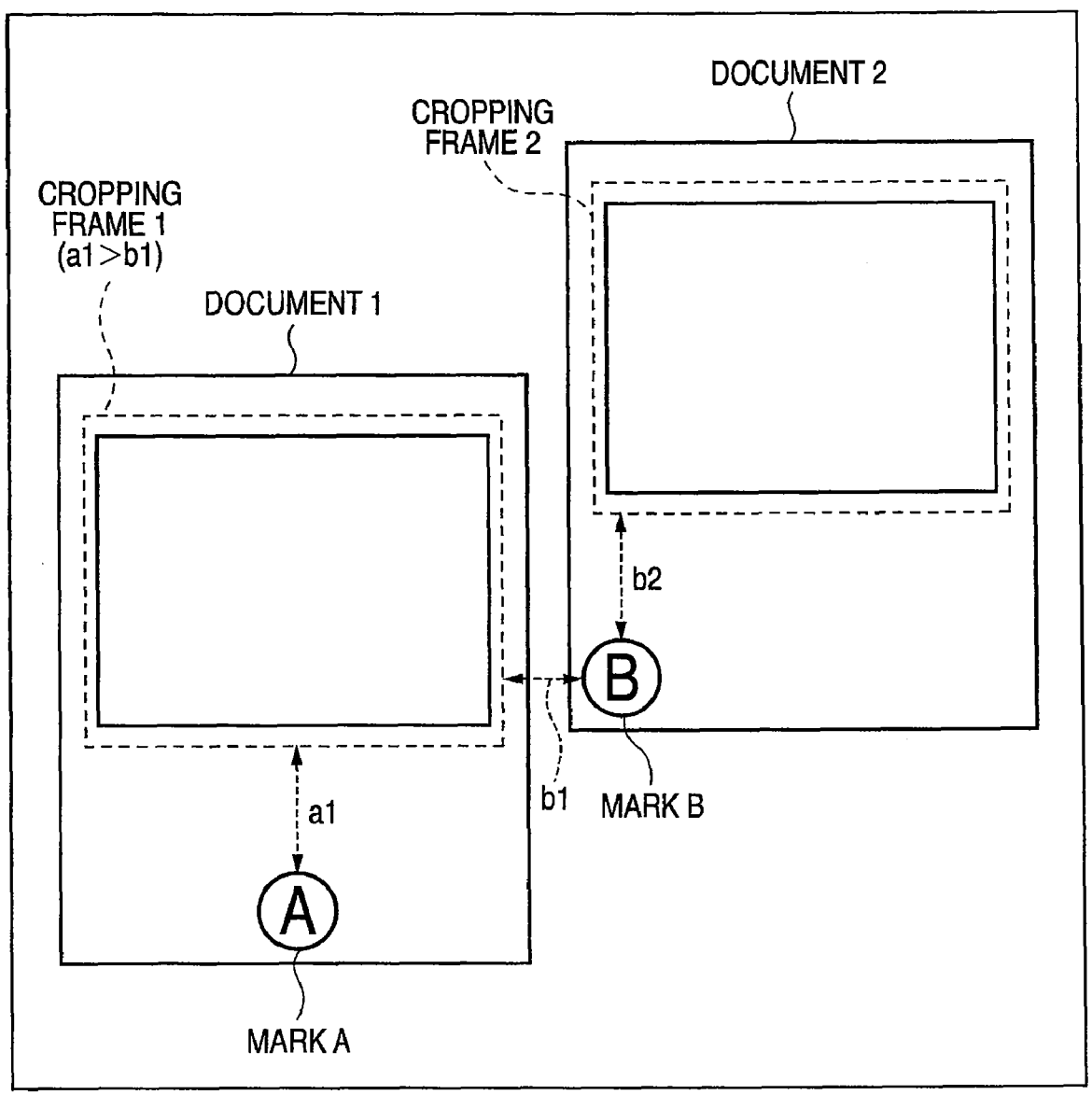
FIG. 10 is a diagram illustrating an example of two documents placed close together.

It is determined at step S813 whether all cropping frames and marks have been associated in one-to-one correspondence. If all have been associated in one-to-one correspondence, control proceeds to step S816. On the other hand, if it is determined that there is mark that has not been associated in one-to-one correspondence, then control proceeds to step S814. A case where a plurality of documents have been placed close together as shown in FIG. 10 corresponds to a case where a mark that has not been associated in one-to-one with a cropping frame correspondence exists.

An unpaired mark is searched and retrieved at step S814.

At step S815, this mark and the closest crop are associated and this mark and crop are excluded from the subject of the search of the mark list and object list, respectively. Control then returns to step S812 and the associating operation is performed again with regard to marks and crops other than those that have been excluded from the subject of the search.

The above-described processing of steps S812 to S815 is executed until marks and cropping frames are associated in one-to-one correspondence.

At step S816, the associated cropping frames and marks are set as the final associations and processing is then exited.

At step S817, it is determined that there is a possibility that a mark has not been added to a document or that marks have been added in superimposed fashion, and an error message is displayed on the display unit. Classification-information editing means by which the user can freely change the classification on the preview screen at this time may be provided.

Figure 11:
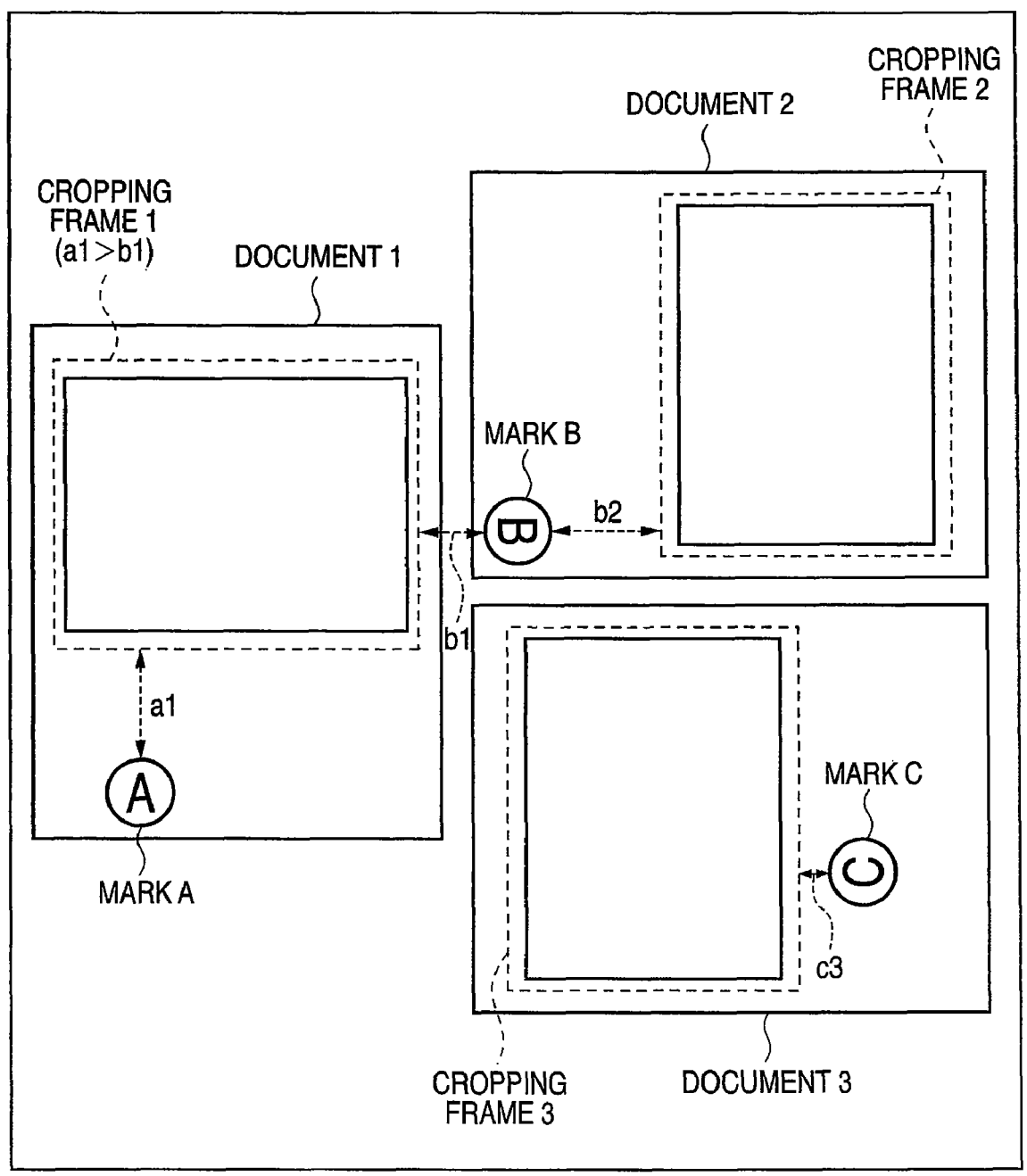
FIG. 11 is a diagram exemplifying a preview screen in a series of processing steps from step S812 to step S816.
Figure 12:
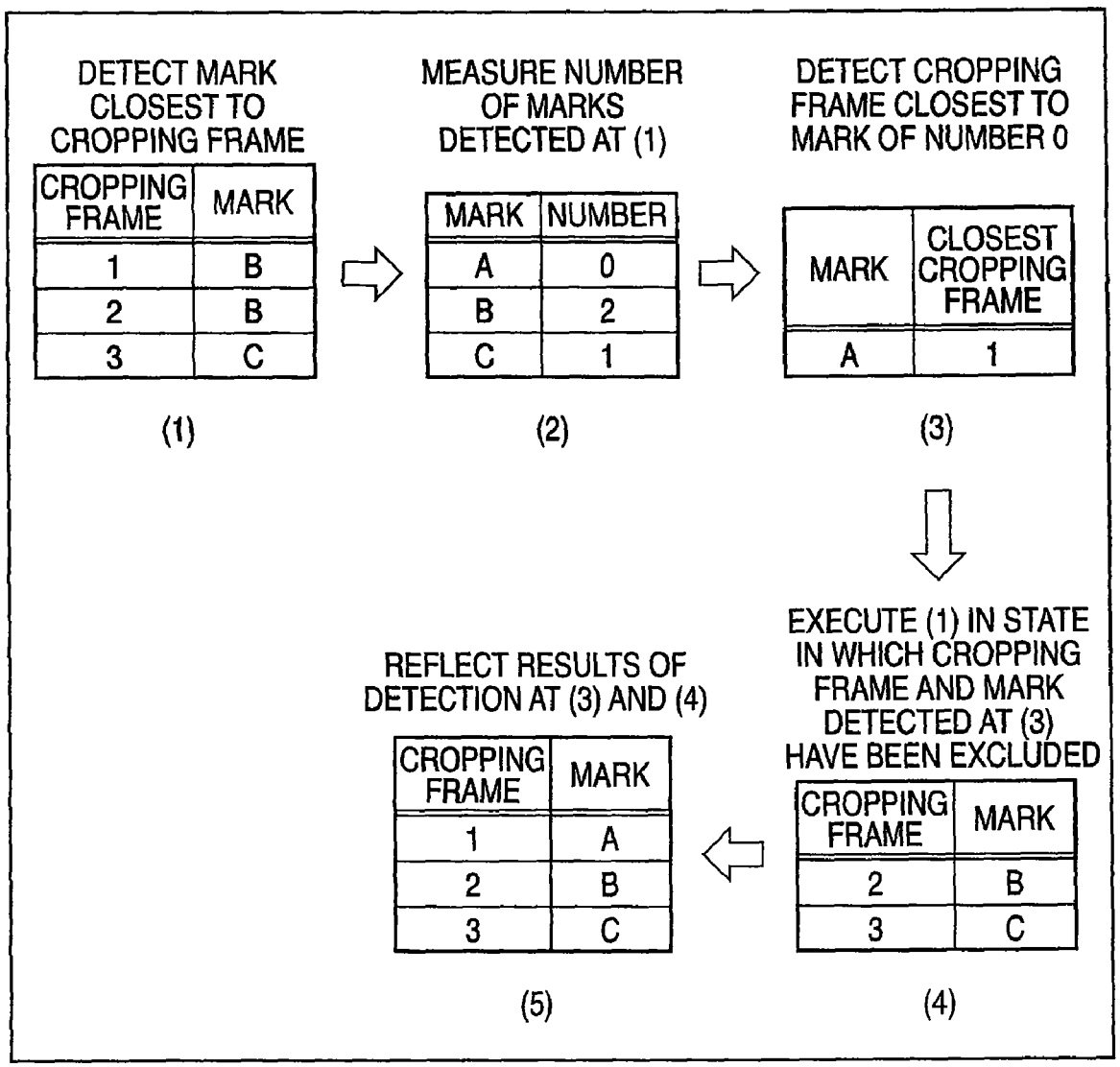
FIG. 12 is a state transition diagram of correspondence tables illustrating association of cropping frames and marks in the series of processing steps from step S812 to step S816.

FIG. 11 is a diagram exemplifying a preview screen involved in the series of processing steps from step S812 to step S816. This example illustrates a case where the position of a mark B is close to a cropping frame 1 and is therefore initially associated as a mark in one-to-one correspondence with cropping frame 1. A mark A, therefore, which is to be associated with cropping frame 1 becomes redundant and is not in one-to-one correspondence with cropping frame 1. FIG. 12 is a state transition diagram in an operation for associating cropping frames and marks in the series of processing steps from step S812 to step S816.

In FIG. 11, documents 1, 2 and 3 are each composed of a mark and a crop in which the mark is not included in the cropping frame, and the mark closest to each cropping frame is searched and retrieved from the object list and mark list. The result of association corresponds to (1) in FIG. 12. In this case, a result in which mark B is associated with two cropping frames is obtained [(2) in FIG. 12]. Under these conditions, a mark that has not yet been associated is searched and retrieved and the result obtained is mark A. Accordingly, the cropping frame closest to mark A is searched and retrieved and cropping frame 1 and mark A are associated with each other [(3) in FIG. 12]. Then, with cropping frame 1 and mark A excluded, the closest mark is found again for each of the remaining cropping frames and the cropping frame and mark are associated [(4) in FIG. 12]. Consequently, a result in which all cropping frames and marks are in one-to-one correspondence is obtained and therefore each cropping frame can be associated with the respective mark [(5) in FIG. 12].

In accordance with the present invention, as described above, a marked image is extracted more accurately and classification based upon the type of mark is made possible. In particular, there can be provided a technique that makes it possible to greatly reduce erroneous detection of cropping frames and instances where erroneous association is performed.

In the description rendered above, the association of marks corresponding to document files is performed based upon solely the positional relationship between cropping frames and marks. However, it is possible to implement more accurate association by providing the shape of a mark with information relating to the image (cropping frame) to undergo association.

Figure 14:
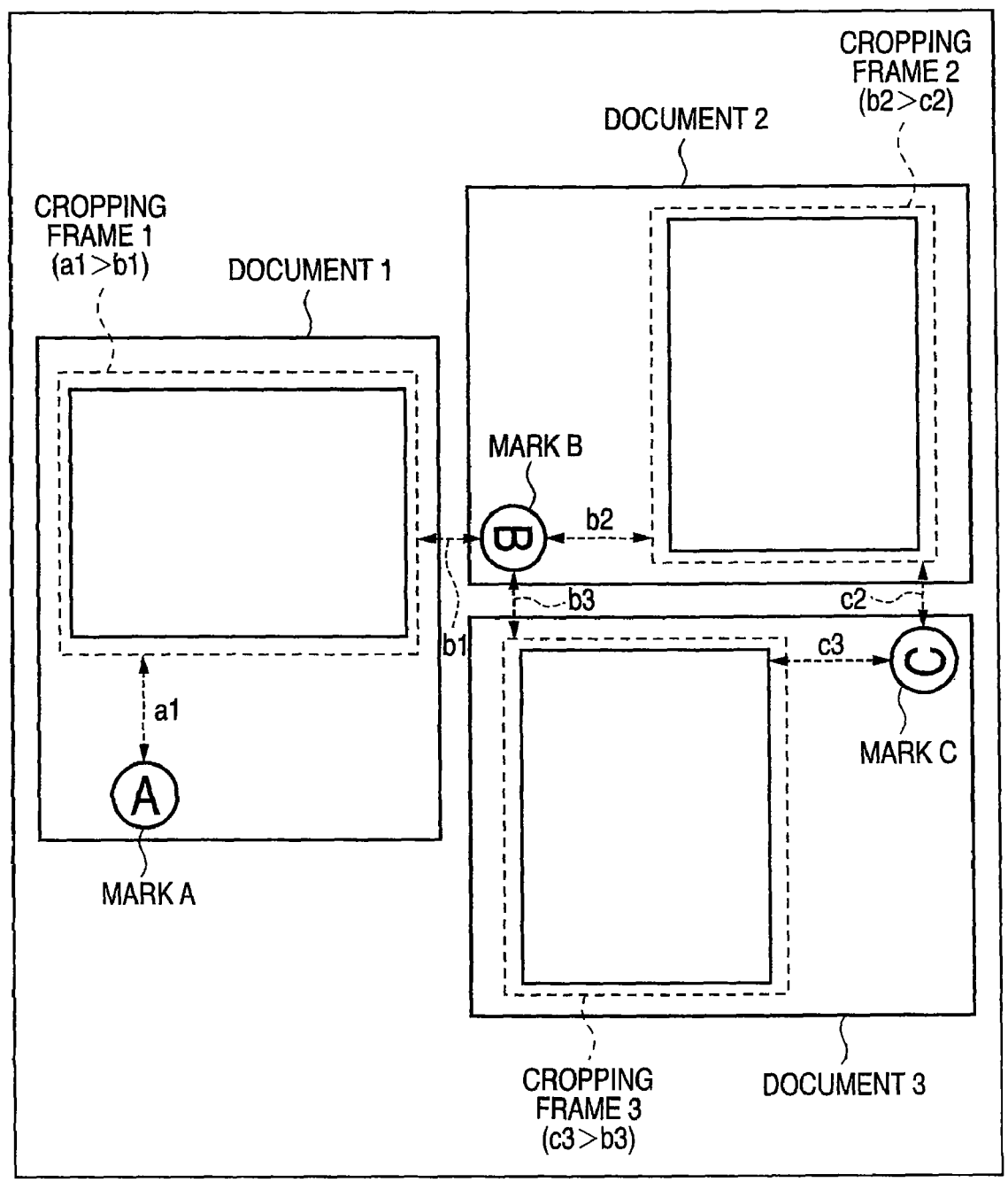
FIG. 14 is a diagram illustrating an example of three documents placed close together.
Figure 15:
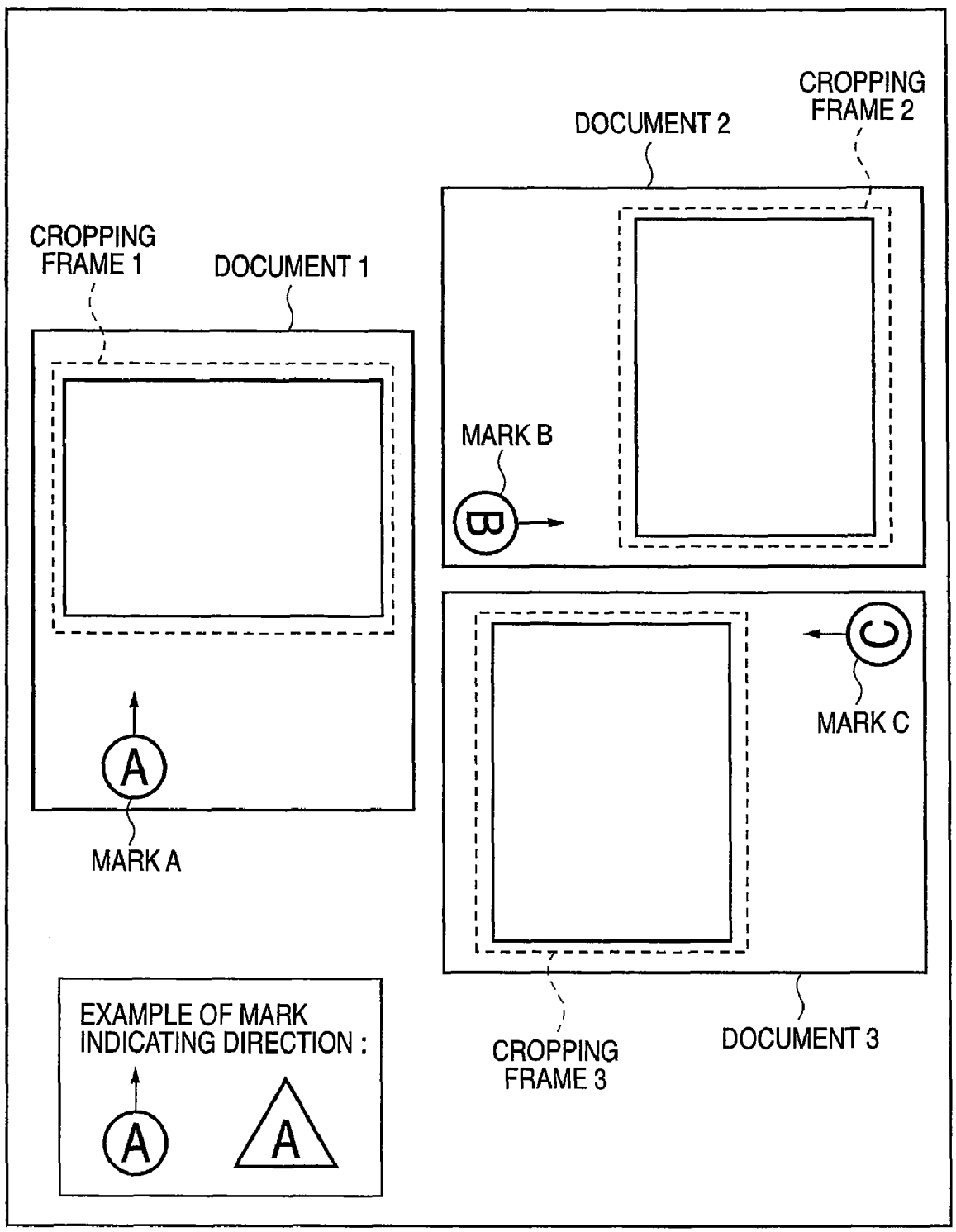
FIG. 15 is a diagram illustrating an example in which use is made of marks having shapes capable of indicating direction.

FIG. 14 is a diagram illustrating an example of placement of three documents. Although FIG. 14 resembles FIG. 11, it differs in that the position of mark C is closer to cropping frame 2. If the flow of processing of steps S812 to S816 of FIG. 8 is executed, there are instances where ultimately it cannot be determined to which of cropping frames 2 and 3 the marks B and C have been appended, and hence the results intended by the user are not always obtained. However, by using a mark having a shape capable of indicating direction and associating the mark preferentially with a cropping frame that corresponds to the indicated direction, as illustrated in FIG. 15, association can be performed more accurately.

First Modification

The first embodiment assumed a case where a single mark is added to a single document. However, a situation where the same mark is added to all of a plurality of documents placed on a document class also is conceivable. In this case the adding on of marks to all documents is troublesome and therefore it may be so arranged that a mark is added to any single document alone.

Figure 13:
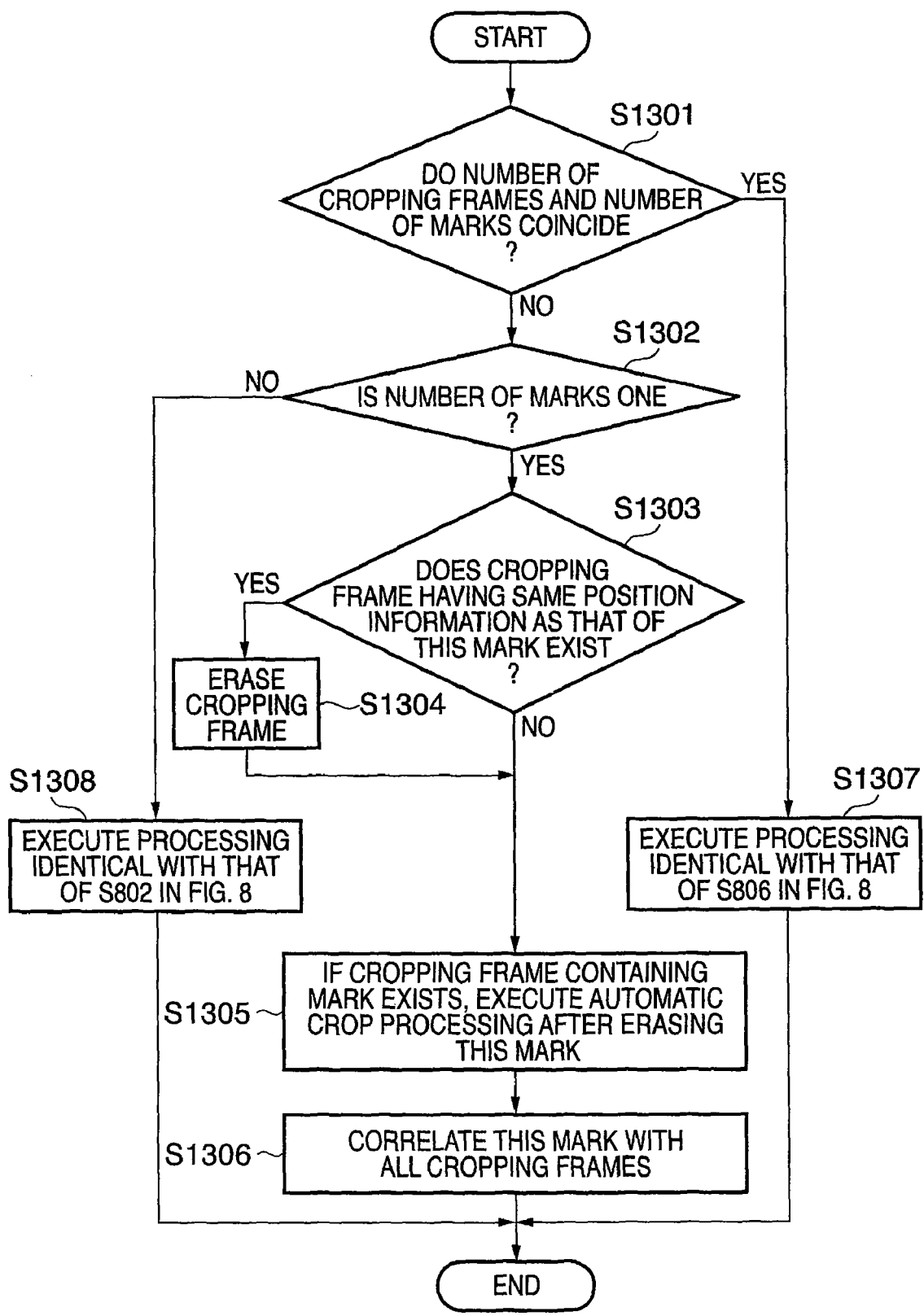
FIG. 13 is a flowchart representing an operation for associating cropping frames and marks in a first modification.

FIG. 13 is a flowchart representing an operation for associating cropping frames and marks according to a first modification. This processing corresponds to step S604 of FIG. 6 and assumes that the step of mark detection (S602) and the step of cropping-frame detection (S603) have already been completed. It should be noted that the steps set forth below are implemented by having the CPU 25 execute the scanner driver 32.

The number of detected crops and the number of marks are compared are compared at step S1301 based upon the object list and mark list. If the number of marks is larger or smaller than the number of crops, control proceeds to step S1302. If the numbers of marks and crops coincide, control proceeds to step S1307 and processing similar to that of step S806 is executed.

It is determined at step S1302 whether the number of marks is one. If it is determined that the number of marks is one, control proceeds to step S1303; otherwise, control proceeds to step S1308 and processing similar to that of step S802 is executed.

With regard to the position information of a certain cropping frame, it is determined at step S1303 whether a mark whose position information coincides with this information exists. If these items of position information coincide, then control proceeds to step S1304; otherwise, control returns to step S1305.

The cropping frame whose position information coincides with that of the mark is erased at step S1304.

At step S1305, a cropping frame containing a mark is subjected to automatic crop processing after the mark is erased. This makes it possible to identify document regions accurately.

At step S1306, the detected single mark is associated with all of the cropping frames and processing is exited.

In accordance with the first modification, as described above, an arrangement in which a mark is added to any single document can be adopted, and it is possible to alleviate the labor involved in added a mark to all documents.

Second Modification

The first embodiment assumed a case where a single mark is added to a single document. However, a case where a plurality of marks are added to a single document placed on a document class also is conceivable. For example, this is equivalent to a case where it is desired that a single document in which both an image A and an image B have been included be classified in both a folder A and a folder B.

Figure 18A:
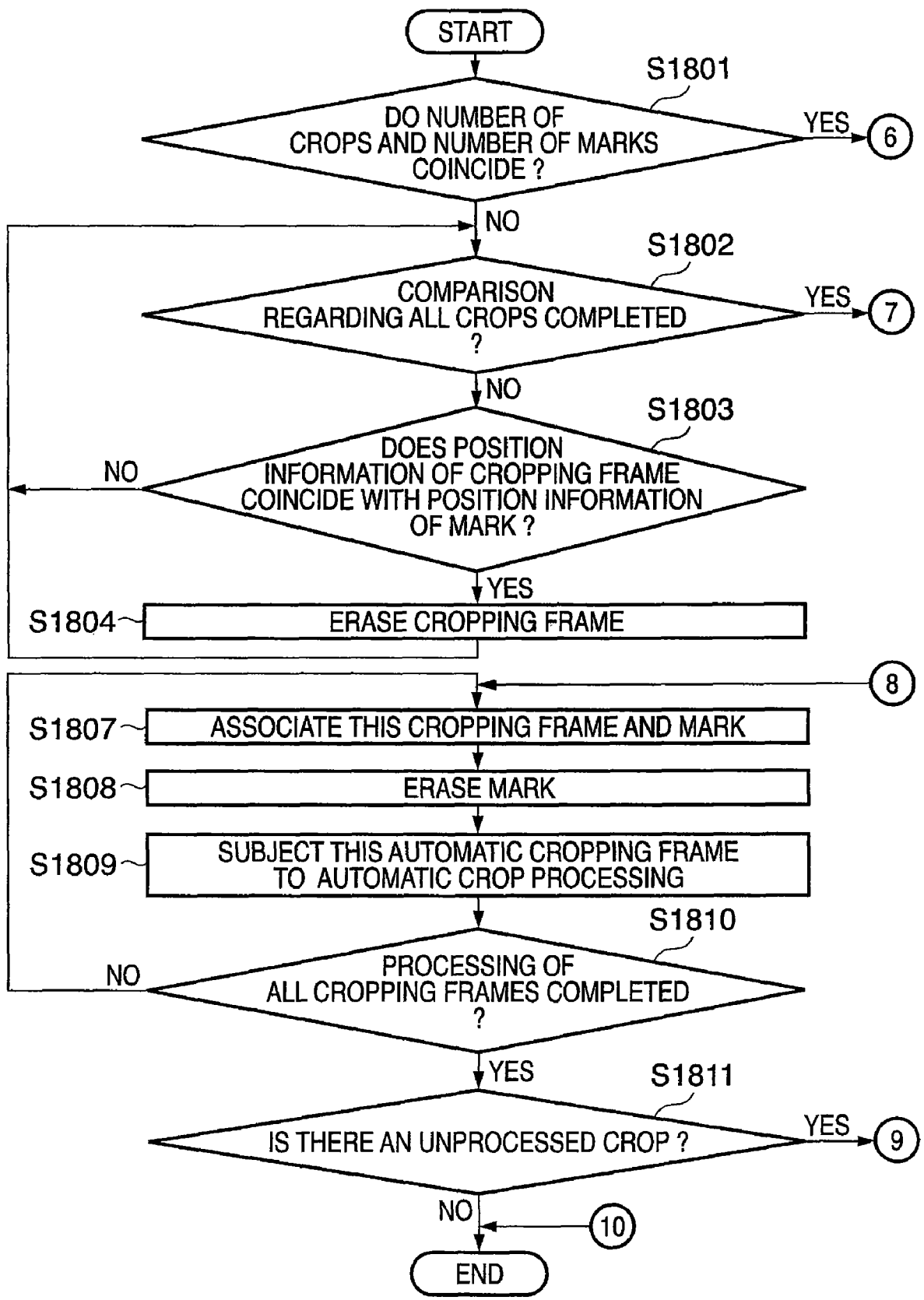
FIG. 18 is a flowchart representing an operation for associating cropping frames and marks.
Figure 18B:
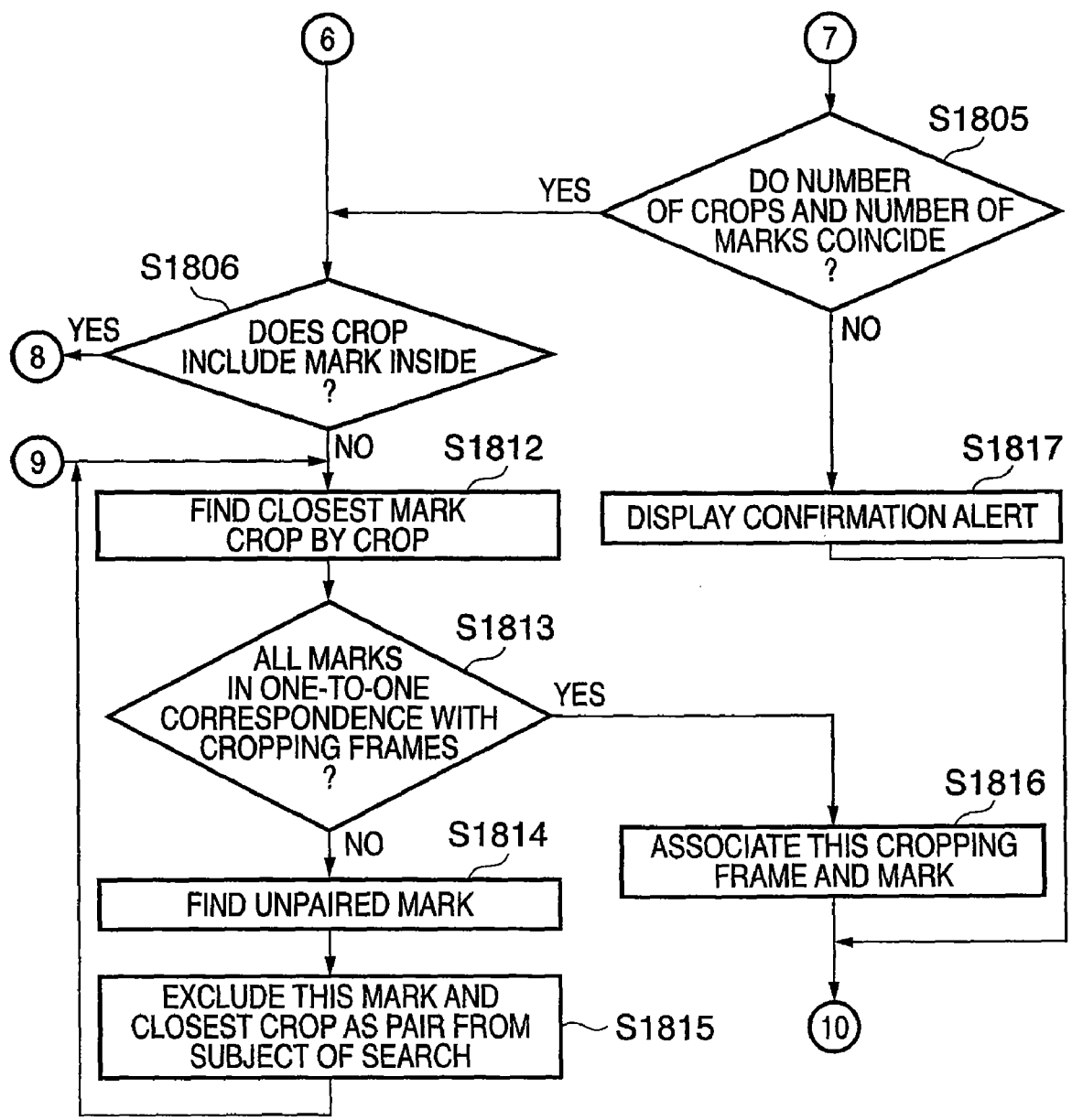

FIG. 18 is a flowchart representing an operation for associating cropping frames and marks according to a second modification. This processing corresponds to step S604 in FIG. 6 and assumes that the step of mark detection (S602) and the step of cropping-frame detection (S603) have already been completed. It should be noted that the steps set forth below are implemented by having the CPU 25 execute the scanner driver 32.

It should be noted that the processing of steps S1801 to S1816 is the same as the processing of steps S801 to S816 of the first embodiment and need not be described again.

Figure 16:
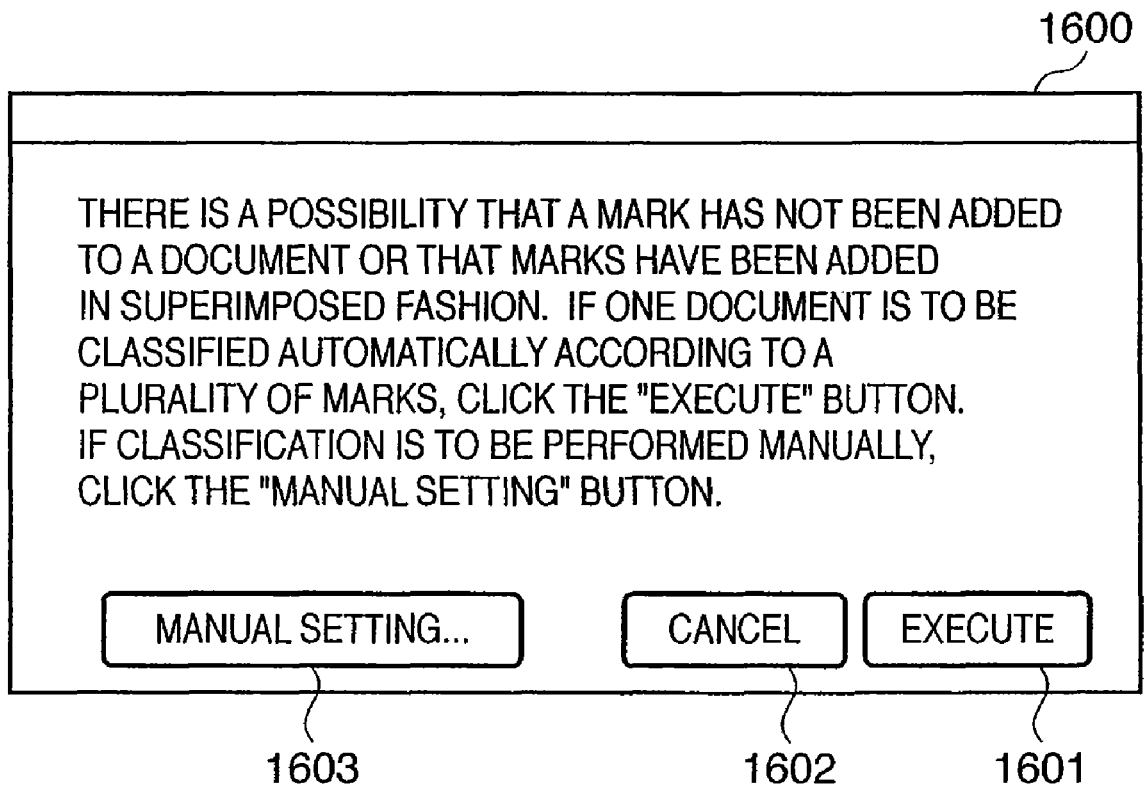
FIG. 16 is a diagram illustrating a confirmation dialog box.

At step S1817, it is determined that there is a possibility that a mark has not been added to a document or that marks have been added in superimposed fashion, and a confirmation alert message shown in FIG. 16 is displayed. If the user clicks a "CANCEL" button 1602, processing similar to that of step S817 is executed.

If the user clicks a "MANUAL SETTING" button 1603, a dialog box (not shown) is displayed for allowing the user to set a mark for a document to which a mark has not been added or for a document to which a plurality of marks are to be added. The user applies the mark by using this dialog box.

If the user clicks an "EXECUTE" button 1601, processing for associating a plurality of marks with a document is executed.

FIG. 17 is a flowchart illustrating an operation for assigning a plurality of marks to a document in a case where the "EXECUTE" button 1601 has been clicked.

In order to specify marks that are the object of a search, a search list is created at step S1701 based the mark list in which all marks are taken as targets.

It is determined at step S1702 whether a certain cropping frame includes the position of a mark inside. If it is determined that a mark is contained within the cropping frame, control proceeds to step S1703; otherwise, control proceeds to step S1709.

This cropping frame and all marks contained within the frame are associated at step S1703.

The mark associated at step S1703 is erased at step S1704. In other words, under the present circumstances, the cropping frame has been set as illustrated in FIG. 9B and therefore the cropping frame is erased temporarily and image recognition is performed again.

Crop processing (automatic crop processing) is executed at step S1706 taking the cropping frame as the object. By executing this processing, the cropping frame can be set accurately with respect to the image region, as illustrated in FIG. 9C.

The processing of the foregoing steps S1703 to S1707 is confirmed with regard to all the cropping frames at step S1707. If the processing has been completed with regard to all of the cropping frames, control proceeds to step S1708; otherwise, control returns to step S1703 and another cropping frame undergoes confirmation.

It is determined at step S1708 whether an unprocessed cropping frame exists. In other words, it is determined whether a crop for which a mark is not included in the cropping frame shown in FIG. 9C exists. If it is determined that an unprocessed cropping frame does not exist, this means that associating processing has been completed for all crops. The flow of processing is exited. If it is determined that there is no cropping frame containing a mark within and that an unprocessed cropping frame exists, then control proceeds to step S1709.

One mark closest to a cropping frame that has not been associated is searched and retrieved at step S1709.

The cropping frame and mark are associated at step S1710.

The mark associated at step S1710 is excluded from the search list at step S1711.

It is determined at step S1712 whether the search list contains a mark that has not been associated. If there is no such mark in the list, then processing is exited by reason of the fact that the association of all marks with any cropping frame has been completed. If the search list contains an unassociated mark, then control proceeds to step S1713 and it is determined whether the association of all cropping frames has ended.

If it is determined at step S1713 that the association of all cropping frames has not ended, then control returns to step S1709 and processing continues until the associating operation ends.

If it is determined at step S1713 that the association of all cropping frames has ended, then control proceeds to step S1714.

It is determined at step S1714 whether there are any marks that have not been associated. If there are no such marks, processing is exited. If such a mark exists, then control proceeds to step S1715.

The cropping frame closest to the mark is searched from the search list at step S1715. The found cropping frame and the mark are associated at step S1716. The mark associated at step S1716 is excluded from the search list at step S1717. Control proceeds to step S1714 and processing is continued until the search list no longer contains marks. The flow of processing is exited at the moment marks vanish from the search list. This completes the processing for associating one or more marks with all cropping frames. In this case, in the processing corresponding to step S608 of FIG. 6 of the overall processing, documents are copied and stored in folders specified according to the respective classifications.

In accordance with the second modification, as described above, even if a plurality of marks have been added to a single document, an image to which the marks have been added are extracted accurately and classification based upon the types of mark is possible.

Other Embodiments

Although an embodiment of the present invention has been described above, the present invention may be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a program, which implements the functions of the foregoing embodiment, directly or remotely to a system or apparatus, reading the supplied program codes by the system or apparatus, and then executing the program codes. Accordingly, since the functional processing of the present invention is implemented by computer, the computer program per se installed on the computer falls within the technical scope of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk (CD, DVD), magneto-optical disk, magnetic tape, non-volatile type memory card and ROM, etc.

As for the method of supplying the program, a client computer can be connected to a website on the Internet using a browser possessed by the client computer, and the program can be downloaded. It may be so arranged that in addition to the computer program per se of the present invention, a compressed file containing an automatic installation function is downloaded. Further, this can be implemented by dividing the program code constituting the program of the present invention into a plurality of files and downloading the files from different websites. In other words, a WWW (World Wide Web) server that downloads, to multiple users, the program for implementing the functional processing of the present invention by computer also is covered by the claims of the present invention.

Further, it may be so arranged that the functions of the above-described embodiment are implemented by having a computer execute a program that has been read. In addition, an operating system or the like running on the computer may perform all or a part of the actual processing based upon the instructions of the program so that the functions of the foregoing embodiment can be implemented by this processing.

Furthermore, a program that has been read from a recording medium may be in a form in which it has been written to a memory provided on a function expansion board inserted into the computer or provided in a function expansion unit connected to the computer. A CPU or the like provided on the function expansion board or in the function expansion unit performs a part of or all of the actual processing based upon the instructions of the program codes and implements the functions of the above embodiment by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-203734, filed Jul. 26, 2006 and No. 2007-159497, filed Jun. 15, 2007, which are hereby incorporated by reference herein in their entirety.

What is claimed is:

1. An image processing apparatus for identifying an object in a document image, which has been scanned by a scanning unit, as well as a mark that has been added to the document, and storing image data of the object in a storage unit upon classifying the image data in accordance with the mark identified, said apparatus comprising:
    an extraction unit adapted to extract information representing a region position of the object and information representing a region position of the mark as an object list and mark list, respectively, from the document image that has been scanned by the scanning unit;
    a search unit adapted to search for information representing the region position of a mark in the mark list for which the distance is the shortest with respect to information representing a region position of each object in the object list; and
    a search control unit which, in a case where the mark list contains information representing the region position of a mark for which there is no shortest distance with respect to information representing the region position of any object in the object list, is adapted to cause said search unit to search for information representing the region position of an object in the object list for which the distance is the shortest with respect to information representing the region position of the mark, and to decide that the information representing the region position of the object is to be associated, exclude the information representing the decided region positions from the respective lists and execute said search unit recursively.

2. The apparatus according to claim 1, further comprising a decision unit which, in a case where the mark list contains information representing the region position of a mark for which there is no shortest distance with respect to information representing the region position of any object in the object list, is adapted to cause said search unit to search for information representing the region position of an object in the object list for which the distance is the shortest with respect to information representing the region position of the mark, and to decide that a plurality of marks have been added to this object.

3. The apparatus according to claim 1, further comprising a judgment unit adapted to judge whether the numbers of items of information representing the region positions in the respective object and mark lists extracted by said extraction unit are the same;
    wherein said search unit and said search control unit are executed in a case where said judgment unit has judged that the numbers of items of information are the same.

4. The apparatus according to claim 3, further comprising a deletion unit which, in a case where said judgment unit has judged that the numbers of items of information are not the same, is adapted to compare the information representing the region positions in the respective object and mark lists, and delete information representing a region position for which agreement has been determined from either the object list or mark list.

5. The apparatus according to claim 1, wherein the mark is a mark capable of indicating direction in a two-dimensional plane, and said apparatus further comprises a direction identification unit adapted to identify the direction indicated by the mark;
    said search unit searching for information representing the region position of a mark in the mark list based upon the direction, which has been identified by said direction identification unit, and distance.

6. The apparatus according to claim 5, wherein said search unit associates information representing the region position of a mark with information representing the region position of an object that first intersects an extension line from the mark along the direction identified by said direction identification unit.

7. A method of controlling an image processing apparatus for identifying an object in a document image, which has been scanned by a scanning unit, as well as a mark that has been added to the document, and storing image data of the object in a storage unit upon classifying the image data in accordance with the mark identified, said method comprising: the use of a computer to perform:
    an extraction step of extracting information representing a region position of the object and information representing a region position of the mark as an object list and mark list, respectively, from the document image that has been scanned by the scanning unit;
    a search step of searching for information representing the region position of a mark in the mark list for which the distance is the shortest with respect to information representing a region position of each object in the object list; and
    a search control step which, in a case where the mark list contains information representing the region position of a mark for which there is no shortest distance with respect to information representing the region position of any object in the object list, is a step of causing said search step to search for information representing the region position of an object in the object list for which the distance is the shortest with respect to information representing the region position of the mark, and deciding that the information representing the region position of the object is to be associated, excluding the information representing the decided region positions from the respective lists and executing said search step recursively.

8. The method according to claim 7, further comprising a decision step which, in a case where the mark list contains information representing the region position of a mark for which there is no shortest distance with respect to information representing the region position of any object in the object list, is a step of causing said search unit to search for information representing the region position of an object in the object list for which the distance is the shortest with respect to information representing the region position of the mark, and deciding that a plurality of marks have been added to this object.

9. A non-transitory computer-readable storage medium storing a computer program for causing a computer to control an image processing apparatus for identifying an object in a document image, which has been scanned by a scanning unit, as well as a mark that has been added to the document, and storing image data of the object in a storage unit upon classifying the image data in accordance with the mark identified, said computer program causing the computer to execute the steps of:

an extraction step of extracting information representing a region position of the object and information representing a region position of the mark as an object list and mark list, respectively, from the document image that has been scanned by the scanning unit;

a search step of searching for information representing the region position of a mark in the mark list for which the distance is the shortest with respect to information representing a region position of each object in the object list; and a search control step which, in a case where the mark list contains information representing the region position of a mark for which there is no shortest distance with respect to information representing the region position of any object in the object list, is a step of causing said search step to search for information representing the region position of an object in the object list for which the distance is the shortest with respect to information representing the region position of the mark, and deciding that the information representing the region position of the object is to be associated, excluding the information representing the decided region positions from the respective lists and executing said search step recursively.

10. The non-transitory computer-readable storage medium according to claim 9, wherein said computer program causes the computer to execute the following further step: a decision step which, in a case where the mark list contains information representing the region position of a mark for which there is no shortest distance with respect to information representing the region position of any object in the object list, is a step of causing said search unit to search for information representing the region position of an object in the object list for which the distance is the shortest with respect to information representing the region position of the mark, and deciding that a plurality of marks have been added to this object.

* * * * *